(12) United States Patent
Rowe et al.

(10) Patent No.: US 9,324,118 B2
(45) Date of Patent: Apr. 26, 2016

(54) INFANT FORMULA TRACKING SYSTEM AND METHOD

(71) Applicant: TIMELESS MEDICAL SYSTEMS. INC., Charlottetown (CA)

(72) Inventors: John L. Rowe, Charlottetown (CA); Brad D. Pineau, Stratford (CA)

(73) Assignee: TIMELESS MEDICAL SYSTEMS INC., Charlottetown, PEI (CA)

( * ) Notice: Subject to any disclaimer, the term of this patent is extended or adjusted under 35 U.S.C. 154(b) by 0 days.

(21) Appl. No.: 14/372,801

(22) PCT Filed: Jan. 17, 2013

(86) PCT No.: PCT/CA2013/000044
§ 371 (c)(1),
(2) Date: Jul. 17, 2014

(87) PCT Pub. No.: WO2013/106915
PCT Pub. Date: Jul. 25, 2013

(65) Prior Publication Data
US 2015/0028100 A1    Jan. 29, 2015

Related U.S. Application Data

(60) Provisional application No. 61/587,562, filed on Jan. 17, 2012.

(51) Int. Cl.
*G06Q 10/08* (2012.01)
*G06Q 50/22* (2012.01)
*G06Q 50/24* (2012.01)

(52) U.S. Cl.
CPC ............... *G06Q 50/22* (2013.01); *G06Q 10/08* (2013.01); *G06Q 10/087* (2013.01); *G06Q 50/24* (2013.01)

(58) Field of Classification Search
CPC ....... G06Q 50/22; G06Q 50/24; G06Q 10/08; G06Q 10/087
See application file for complete search history.

(56) References Cited

U.S. PATENT DOCUMENTS

| | | |
|---|---|---|
| 6,097,995 A | 8/2000 | Tipton et al. |
| 6,952,681 B2 | 10/2005 | McQuade et al. |
| 7,072,840 B1 | 7/2006 | Mayaud |
| 7,630,908 B1 | 12/2009 | Amrien et al. |
| 7,747,477 B1 | 6/2010 | Louie et al. |
| 7,853,468 B2 | 12/2010 | Callahan et al. |
| 7,905,401 B2 | 3/2011 | Silverbrook et al. |
| 7,980,467 B2 | 7/2011 | Silverbrook et al. |
| 7,991,507 B2 | 8/2011 | Lift et al. |
| 8,032,431 B2 | 10/2011 | Kataria et al. |

(Continued)

OTHER PUBLICATIONS

International Search Report (ISR) dated Apr. 22, 2013 in corresponding case PCT/CA2013/000044.

(Continued)

*Primary Examiner* — Kristy A Haupt
(74) *Attorney, Agent, or Firm* — Norton Rose Fulbright Canada LLP

(57) ABSTRACT

There is described herein a system and method for tracking an infant formula product. Coded data representative of a unique identity of the formula product is attached thereto and read to allow inventory control and track the allocation of the infant formula product to a user. For instance, safety mechanisms can be put into place to ensure the authenticity of the formula product and that the user is fed the product in accordance with a prescribed composition.

19 Claims, 50 Drawing Sheets

(56) References Cited

U.S. PATENT DOCUMENTS

| | | |
|---|---|---|
| 8,037,846 B2 | 10/2011 | Pratt |
| 8,044,778 B2 | 10/2011 | Monroe |
| 2008/0087726 A1 | 4/2008 | Norman et al. |
| 2009/0043253 A1 | 2/2009 | Podaima |
| 2009/0194587 A1* | 8/2009 | DeVet et al. ............ 235/385 |
| 2010/0026493 A1 | 2/2010 | Rinkes et al. |
| 2010/0063613 A1 | 3/2010 | Popp |
| 2010/0324722 A1 | 12/2010 | Fitchie et al. |
| 2011/0068922 A1 | 3/2011 | Ross |
| 2011/0279271 A1 | 11/2011 | Monroe |

OTHER PUBLICATIONS

International Preliminary Report on Patentability (IPRP) dated May 28, 2014 in corresponding case PCT/CA2013/000044.

\* cited by examiner

MANAGE FORMULA PRODUCTS

This list of users allows you to add or edit existing formula products

Add Formula Product

| | NAME | ORDER | BARCODE | LABEL2 | TYPE | |
|---|---|---|---|---|---|---|
| Go | | | | | | |
| | Enfamil® EnfaCare® | 10 | 165702 | No | Mead Johnson Product | Edit |
| | Nutramigen® | 20 | 165703 | No | Mead Johnson Product | Edit |
| | Enfamil® Gentlease® | 30 | 165704 | No | Mead Johnson Product | Edit |
| | Enfamil PREMIUM® Newborn | 40 | 165701 | No | Mead Johnson Product | Edit |
| | Enfamil A R ® | 50 | 165705 | No | Mead Johnson Product | Edit |
| | Enfamil® ProSobee® | 60 | 165706 | No | Mead Johnson Product | Edit |
| | Enfamil® Premature | 70 | 165707 | No | Mead Johnson Product | Edit |
| | Pregestimil® | 90 | 165709 | No | Mead Johnson Product | Edit |
| | Enfamil PREMIUM® Infant | 100 | 165710 | No | Mead Johnson Product | Edit |
| | Nutramigen® AA™ | 110 | 165711 | No | Mead Johnson Product | Edit |

Viewing Page 1 of 1    Records Found 10

FIGURE 12

MANAGE BABIES

This list of babies allows you to add new or view and edit existing babies

Add Baby

| | LAST NAME | FIRST NAME | DATE OF BIRTH | BABY ID | MOTHER | MOTHER ID | ACTIVE? | | | |
|---|---|---|---|---|---|---|---|---|---|---|
| Go | | | | ▼ | | ▼ | Active ▼ | | | |
| | Hastelow | Hayden | 10/31/2011 | BAB000004 | Hastelow, Linda | MOM000004 | | Edit | View | Print |
| | MacDonald | Mia | 10/29/2011 | BAB000001 | MacDonald, Jennifer | MOM000001 | | Edit | View | Print |
| | MacKenzie | Jack | 10/27/2011 | BAB000003 | MacKenzie, Margaret | MOM000003 | | Edit | View | Print |
| | Smith | Brandon | 10/31/2011 | BAB000002 | Smith, Cindy | MOM000002 | | Edit | View | Print |

Viewing Page 1 of 1   Records Found 4

ADD MOTHER

Fields marked with an * are required

First Name

Last Name

Phone Number:

Date of Birth      Select Date

Active?   Active ▼

Save      Cancel

FIGURE 24

MOTHER INFORMATION

MOM000004          Edit Mother Information
    Hastelow, Linda       Print Mother Label
    902-555-9000
    01/28/1984
    Yes

MOTHER'S BABIES

View   Edit   Hastelow, Hayden (BAB000004)   October 31, 2011   test   Active        Add Baby

FIGURE 25

MANAGE MOTHERS

This list of Mothers allows you to add new or view and edit existing Mothers

Add Mother

| | LAST NAME | FIRST NAME | DATE OF BIRTH | MOTHER ID | ACTIVE? | | | |
|---|---|---|---|---|---|---|---|---|
| Go | | | | | Active ▼ | | | |
| | Hastelow | Linda | 01/28/1984 | MOM000004 | | Edit | View | Print |
| | MacDonald | Jennifer | 10/15/1976 | MOM000001 | | Edit | View | Print |
| | MacKenzie | Margaret | 07/10/1981 | MOM000003 | | Edit | View | Print |
| | Smith | Cindy | 09/19/1975 | MOM000002 | | Edit | View | Print |

Viewing Page 1 of 1   Records Found: 4

EDIT USER

Fields marked with an * are required

User ID: USR000001

User is a template for permissions?: ☐

First Name: Timeless

Last Name: Admin

Password:

Confirm Password:
Leave blank if you don't want to change the password

Account Status: Active ▼ (users who are set as inactive are unable to login)

Template User: ▼ Populate permissions from template

Force Password Change?: ☐ Check this to force a password change on next login

Default Printer: Blank Printer ▼

Unit: ▼

Click here to create a new unit

User Groups: ☐ test group

User Permissions

Manage Babies and Mothers
[check all] [uncheck all]
- ☑ View Babies
- ☑ Edit Babies
- ☑ Add Babies
- ☑ Print Baby Barcodes
- ☑ View Mothers
- ☑ Edit Mothers
- ☑ Add Mothers
- ☑ Print Mothers Barcodes
- ☑ Discharge Babies

Manage Breastmilk
[check all] [uncheck all]
- ☑ Print Bottle Labels
- ☑ Receive Bottles from Mother
- ☑ Receive Bottles from Milk Bank
- ☑ Store / Move Bottles
- ☑ Find Bottle/s
- ☑ Edit Orders
- ☑ Add Orders
- ☑ Prepare Bottles
- ☑ Feed Babies
- ☑ Dispose Bottles
- ☑ Reprint Bottle Barcode Labels
- ☑ Reprint Bottle Information Labels
- ☑ Set Volumes in Bottles

Reporting
[check all] [uncheck all]
- ☑ Print Bottle Finder Report
- ☑ Print Bottle History Report
- ☑ Print Bottles No Longer Needed Report
- ☑ Print Outdated Bottles Report
- ☑ Print Feeding Report
- ☑ Print Formula Additive Lot Report
- ☑ Print User Errors Report
- ☑ Print Volume Report
- ☑ Print Baby Information Report
- ☑ Print Donor Milk Banking Report

System Administration
[check all] [uncheck all]
- ☑ Setup Users
- ☑ Setup User Groups
- ☑ Setup Website Messages
- ☑ Setup Locations
- ☑ Show User Identification in user error reports
- ☑ Setup Printers
- ☑ Change User Passwords
- ☑ Change User Permissions
- ☑ Setup Units
- ☑ Setup Formula Locations
- ☑ Setup Formula Products

Manage Formula
[check all] [uncheck all]
- ☑ Receive Formula
- ☑ Prepare Formula
- ☑ Feed Formula
- ☑ Dispense Formula
- ☑ Split Formula Cartons
- ☑ Move Formula
- ☑ Dispose Formula Save   Cancel

PREPARE FORMULA

You have successfully prepared containers for baby Adams, John
Containers FRM0001L9, FRM0001LF had new labels printed Please affix the barcodes to the bottles in the following manner:

| BOTTLE | LABEL | EXPIRATION |
|---|---|---|
| FRM0001L9 | FRM0001L9 | January 9, 2013, 2:17 AM |
| Container 1 | FRM0001LF | February 1, 2013, 12:00 AM |

Prepare Another Bottle
Feed Bottles to Baby
Reprint Bottle Information Label(s)

FIGURE 52

PREPARE FORMULA

Click the Calculator icon to open the Women & Infants Recipe Calculator. This tool will not affect the data on this page, but you can use it to aid in your calculations.

| | Original | | |
|---|---|---|---|
| FRM0001LA<br>02/01/2013 00:00 | 0.00 | mL | |
| Total | 0.00 | mL | |

Number of containers being prepared
2

Container 1        *Expiration: February 1, 2013, 12:00 AM\**

Location

Volume   0.00   mL

Milk from these sources have been used in this container:
☑ FRM0001LA

Container 2        *Expiration: February 1, 2013, 12:00 AM\**

Location

Volume   0.00   mL

Milk from these sources have been used in this container:
☑ FRM0001LA

| | Remaining | | |
|---|---|---|---|
| Total | 0.00 | mL | |
| FRM0001LA<br>02/01/2013 00:00 | 0.00 | mL | Dispose |

Select Printer

\* Estimate only - actual expiration may vary.

Cancel      << Previous      Next >>

FIGURE 53

CREATE FORMULA BOTTLES

Formula Name
ENFALYTE CHERRY NUR 2OZ (8X6BTL) US
Quantity of Bottles to create
20

Select the existing location
Carton Location A
Select the new location

Is the container empty?
No

Select Printer

Cancel    << Previous    Next >>

FIGURE 55

INFANT FORMULA TRACKING SYSTEM AND METHOD

CROSS-REFERENCE TO RELATED APPLICATIONS

The present application is a US National Stage of International Application No. PCT/CA2013/000044, filed on Jan. 17, 2013, which claims priority under 35 USC §119(e) of U.S. Provisional Patent Application No. 61/587,562 filed on Jan. 17, 2012, the contents of which are hereby incorporated by reference.

TECHNICAL FIELD

The present invention relates to the field of tracking and managing infant formula using barcodes and software tools.

BACKGROUND OF THE ART

Infant formula refers to modified milk products or milk substitutes for feeding infants in place of breast feeding. The nutritional composition is adjusted to approximate that of breast milk, and is controlled by legal standards. Special formula preparations are available for premature babies and those of very low birth weight. For infants intolerant to cow's milk, there are special formula preparations based on soy or other products. For those with genetic diseases, a range of special formulae are available.

Because of the critical role infant formula feedings play in infant health and development, as well as the implications that feeding errors can have on infant safety, careful managing and tracking of infant formula products should be ensured. Inventory control is also desirable. In particular, when feeding an infant with an infant formula product, it should be ensured that the right formula product is fed to the infant. This entails ensuring that the infant is not fed an expired product, is fed a formula in accordance with a prescribed composition, and that the formula product is not a counterfeit.

There is therefore a need for an improved system and method for tracking and managing infant formula.

SUMMARY

In accordance with a first broad aspect, there is provided a system for tracking an infant formula product, the system comprising a memory having stored therein a plurality of inventory records each associated with a corresponding one of a plurality of infant formula products provided at a facility, each one of the plurality of inventory records comprising product data uniquely identifying the corresponding infant formula product, the product data comprising a formula composition of the corresponding infant formula product, a processor coupled to the memory, and at least one application stored in the memory and executable by the processor for receiving infant data indicating that an infant is to be allocated a desired formula composition, querying the memory with the infant data for comparing the desired formula composition to the formula composition of each one of the plurality of infant formula products and identifying on the basis of the comparison at least one of the plurality of infant formula products suitable for allocating to the infant, receiving data uniquely identifying a selected one of the plurality of infant formula products, comparing the coded data to the product data of the at least one suitable infant formula product, and outputting a confirmation that the selected one of the plurality of infant formula products is suitable for allocating to the infant if the coded data matches the product data of the at least one suitable infant formula product.

In accordance with a second broad aspect, there is provided a computer-implemented method for tracking an infant formula product, the method comprising executing on a processor program code for receiving infant data indicating that an infant is to be allocated a desired formula composition, querying a memory with the infant data for comparing the desired formula composition to a formula composition of each one of a plurality of infant formula products, the memory having stored therein a plurality of inventory records each associated with a corresponding one of the plurality of infant formula products provided at a facility, each one of the plurality of inventory records comprising product data uniquely identifying the corresponding infant formula product, the product data comprising a formula composition of the corresponding infant formula product, identifying on the basis of the comparison at least one of the plurality of infant formula products suitable for allocating to the infant, receiving coded data uniquely identifying a selected one of the plurality of infant formula products, comparing the coded data to product data of the at least one suitable infant formula product, and outputting a confirmation that the selected one of the plurality of infant formula products is suitable for allocating to the infant if the coded data matches the product data of the at least one suitable infant formula product.

In accordance with a third broad aspect, there is provided a computer readable medium having stored thereon program code executable by a processor for tracking an infant formula product, the program code executable for receiving infant data indicating that an infant is to be allocated a desired formula composition, querying a memory with the infant data for comparing the desired formula composition to a formula composition of each one of a plurality of infant formula products, the memory having stored therein a plurality of inventory records each associated with a corresponding one of the plurality of infant formula products provided at a facility, each one of the plurality of inventory records comprising product data uniquely identifying the corresponding infant formula product, the product data comprising a formula composition of the corresponding infant formula product, identifying on the basis of the comparison at least one of the plurality of infant formula products suitable for allocating to the infant, receiving coded data uniquely identifying a selected one of the plurality of infant formula products, comparing the coded data to product data of the at least one suitable infant formula product, and outputting a confirmation that the selected one of the plurality of infant formula products is suitable for allocating to the infant if the coded data matches the product data of the at least one suitable infant formula product.

BRIEF DESCRIPTION OF THE DRAWINGS

Further features and advantages of the present invention will become apparent from the following detailed description, taken in combination with the appended drawings, in which:

FIGS. 8 to 57 are exemplary screen shots of the software tool for managing and tracking the infant formula;

It will be noted that throughout the appended drawings, like features are identified by like reference numerals.

DETAILED DESCRIPTION

Figure 1:
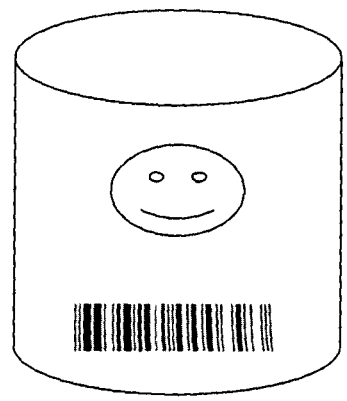
FIG. 1 is an exemplary embodiment of a container for infant formula have a barcode.
Figure 2:
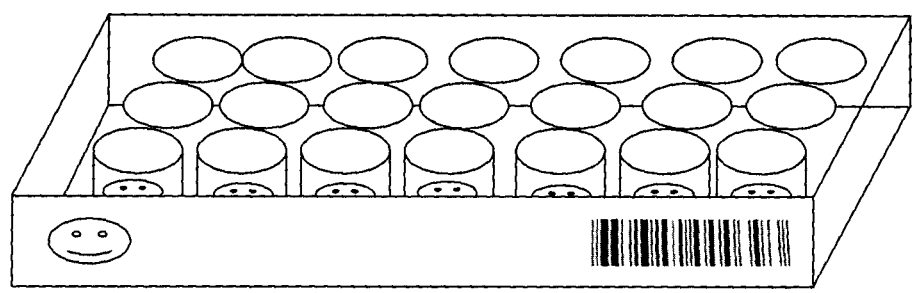
FIG. 2 is an exemplary embodiment of a carton of infant formula containers from FIG. 1, with a barcode.
Figure 3:
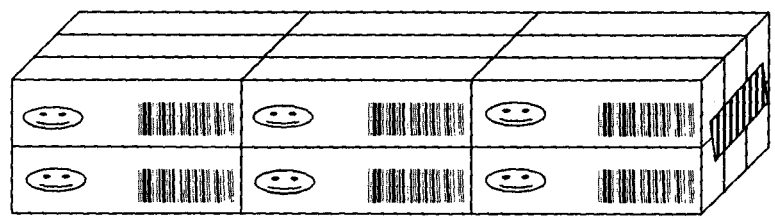
FIG. 3 is an exemplary embodiment of a case of cartons of infant formula containers from FIG. 2, with a barcode.

FIG. 1 illustrates a single infant formula container with a barcode attached thereto. FIG. 2 illustrates a carton of infant formula containers with a barcode attached thereto. FIG. 3 illustrates a crate (or case) of cartons of infant formula containers with a barcode attached thereto. The barcode may be provided on the container and/or packaging, as illustrated. It may be provided on a manufacturing line at the time of production, using print, laser, stickers, or other known attachment means. The container may be made of plastic, glass, metal, etc, and the code may be inscribed directly on the container or on a label affixed to the container.

Some exemplary 2D barcode symbologies include Aztec code, Code 1, DataMatrix, MaxiCode, QRCode, and SuperCode. Other known 2D barcodes may also be used. It should be understood that a similar functionality may also be provided using Radio Frequency Identification (RFID) with an RFID tag being attached to the infant formula container and/or packaging. Some of the information provided in the barcode includes, but is not limited to, batch number, product code, expiry date, date/time of print, location of print, and composition of the formula.

The barcode may be encrypted using any known encryption schemes, such as, but not limited to, AES: the Advanced Encryption Standard specified by the National Institute of Standards and Technology (NIST) FIPS-197; DES: the Data Encryption Standard algorithm defined by NIST FIPS-46-3; DES-EDE: the "Triple DES" algorithm defined by NIST FIPS-46-3; DESX: The extended Data Encryption Standard symmetric encryption algorithm; RC2: The RC2 block symmetric encryption algorithm defined by RFC 2268; RC4: The RC4 symmetric encryption algorithm; RC5: The RC5 encryption algorithm; PBE: Password-based encryption algorithm defined in PKCS #5; MD2: The MD2 hash algorithm defined by RFC 1319; MD5: The defined by RFC 1321; RIPEMD160: RACE Integrity Primitives Evaluation Message Digest 160-bit message digest algorithm and cryptographic hash function; SHA-1: The 160-bit secure hash algorithm defined by FIPS 180-2 and FIPS 198; SHA-224: The 224-bit secure hash algorithm defined by FIPS 180-2 and FIPS 198; SHA-256: The 256-bit secure hash algorithm defined by FIPS 180-2 and FIPS 198; SHA-384: The 384-bit secure hash algorithm defined by FIPS 180-2 and FIPS 198; SHA-512: The 512-bit secure hash algorithm defined by FIPS 180-2 and FIPS 198; HMAC-MD5: The hash message authentication code calculated using the MD5 hash algorithm; HMAC-RIPEMD160: The hash message authentication code calculated using the RACE Integrity Primitives Evaluation Message Digest 160-bit message digest algorithm and cryptographic hash function; HMAC-SHA1: The hash message authentication code calculated using the 160-bit secure hash algorithm defined by FIPS 180-2 and FIPS 198; HMAC-SHA224: The hash message authentication code calculated using the 224-bit secure hash algorithm defined by FIPS 180-2 and FIPS 198; HMAC-SHA256: The hash message authentication code calculated using the 256-bit secure hash algorithm defined by FIPS 180-2 and FIPS 198; HMAC-SHA384: The hash message authentication code calculated using the 384-bit secure hash algorithm defined by FIPS 180-2 and FIPS 198; HMAC-SHA512: The hash message authentication code calculated using the 512-bit secure hash algorithm defined by FIPS 180-2 and FIPS 198; RSA: The RSA public key algorithm defined by PKCS#1 v1.5 and v2.0; DSA: The digital signature algorithm defined by FIPS 186-2; Diffie-Hellman: The Diffie-Hellman key exchange algorithm defined by PKCS #3; CFMX_COMPAT: the algorithm used in ColdFusion MX and prior releases. This algorithm is the least secure option (default); BLOWFISH: the Blowfish algorithm defined by Bruce Schneier; CAST5: Symmetric algorithms (Symmetric-key algorithms); IDEA: Symmetric algorithms (Symmetric-key algorithms); Serpent: Symmetric algorithms (Symmetric-key algorithms); Triple DES: Symmetric algorithms (Symmetric-key algorithms); Twofish: Symmetric algorithms (Symmetric-key algorithms); Mysti1: 128 bits; Square:L 128 bits; and Tea: (16 rounds 128 bits) and (32 rounds 128 bits).

Figure 4:
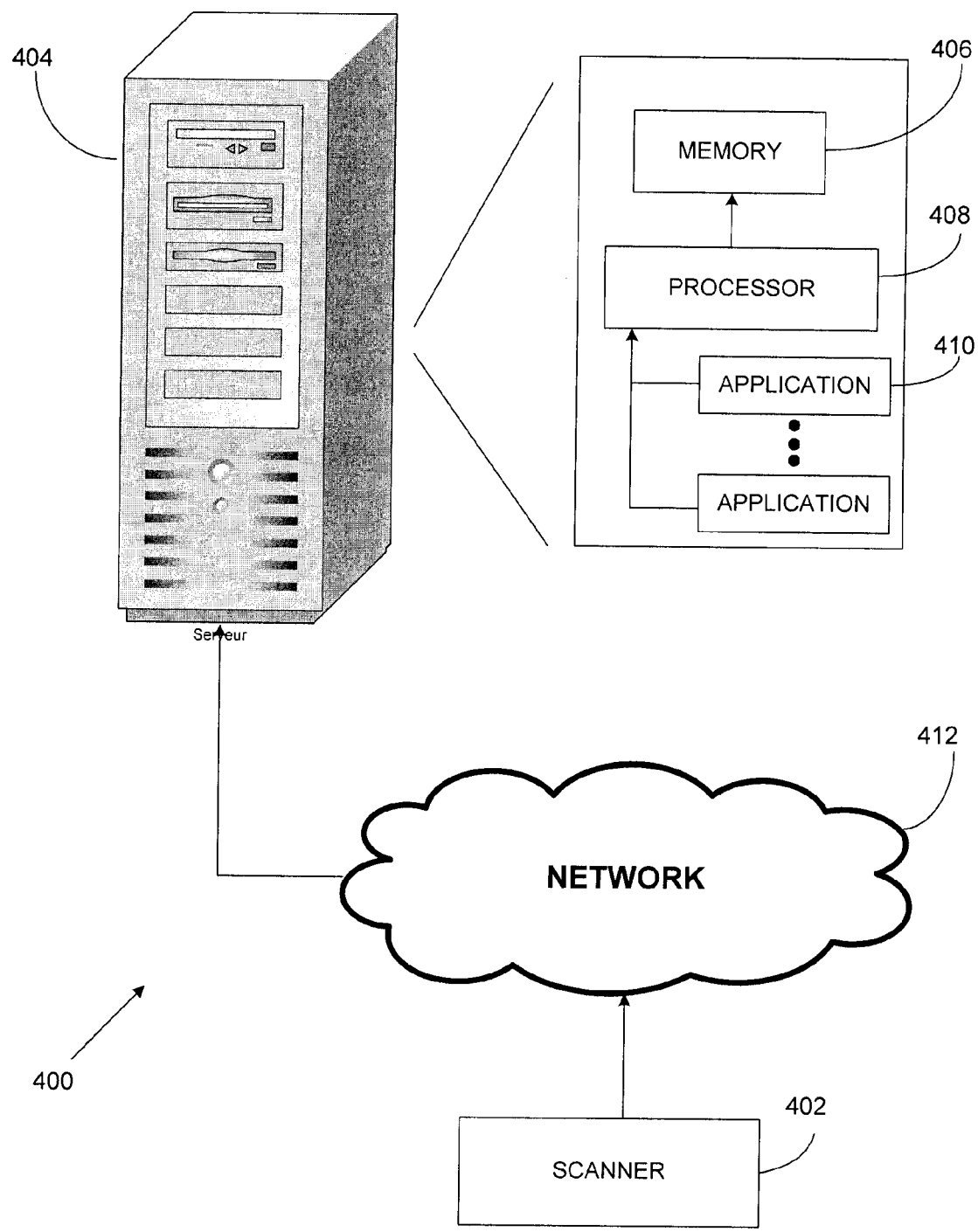
FIG. 4 is an exemplary embodiment for a system for scanning the barcodes and extracting data therefrom.

FIG. 4 is an exemplary embodiment of a system 400 for scanning a barcode and extracting data therefrom. One or more server(s) 404 are provided locally and/or remotely and accessible via a network 412. For example, a series of servers corresponding to a web server, an application server, and a database server. These servers are all represented by server 404 in FIG. 4. The server 404 is accessed by a scanning device 402. The scanning device 402 may come in a variety of forms capable of reading preprinted alphanumeric characters in specific fonts, barcodes, or hand-printed letters or symbols, such as encoders, document scanners, and wand scanners. A scan head reads the barcode image which is then interpreted by the computer and output in a usable format. Some exemplary barcode readers are the Motorola™ MC75, Motorola™ DS, and Honeywell Xenon™.

The scanning device 402 may be connected to the server 404 directly (i.e. wired) or it may be connected via any type of network 412, such as the Internet, the Public Switch Telephone Network (PSTN), a cellular network, or others known to those skilled in the art.

The server 404 comprises, amongst other things, a plurality of applications 410 running on a processor 408, the processor 408 being coupled to a memory 406. It should be understood that while the applications 410 presented herein are illustrated and described as separate entities, they may be combined or separated in a variety of ways.

One or more databases (not shown) may be integrated directly into memory 406 or may be provided separately therefrom and remotely from the server 404. In the case of a remote access to the databases, access may occur via any type of network 412, as indicated above. The various databases described herein may be provided as collections of data or information organized for rapid search and retrieval by a computer. They are structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number "443" to be placed into the packets. Port "443" is the number assigned to the SSL application on the server. Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 406 accessible by the processor 408 receives and stores data. The memory 406 may be a main memory, such as a high speed Random Access Memory (RAM), or an auxiliary storage unit, such as a hard disk or flash memory. The memory 406 may be any other type of memory, such as a Read-Only Memory (ROM), Erasable Programmable Read-Only Memory (EPROM), or optical storage media such as a videodisc and a compact disc.

The processor 408 may access the memory 406 to retrieve data. The processor 408 may be any device that can perform operations on data. Examples are a central processing unit (CPU), a front-end processor, a microprocessor, a graphics processing unit (GPU/VPU), a physics processing unit (PPU), a digital signal processor, and a network processor. The applications 410 are coupled to the processor 408 and configured to perform various tasks as explained below in more detail.

Figure 5:
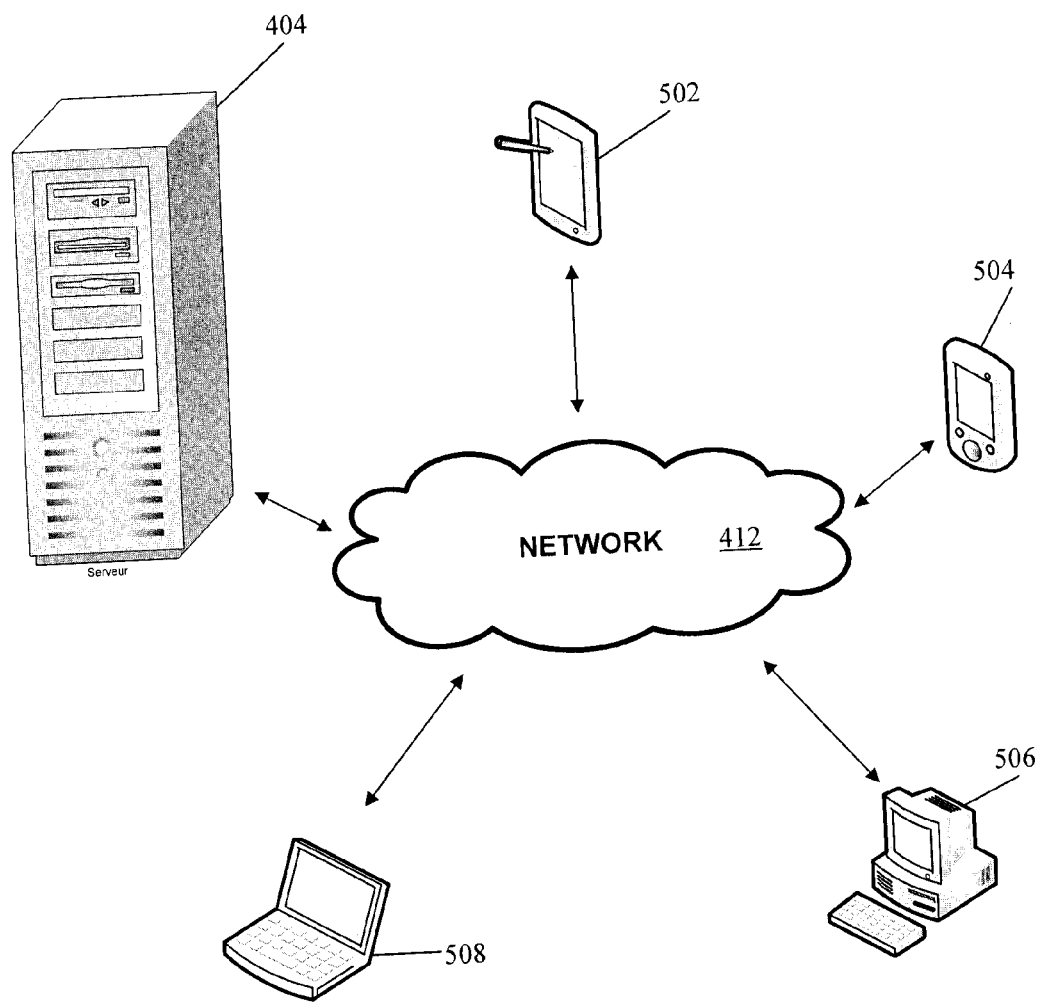
FIG. 5 is an exemplary embodiment of a system for accessing the software tool used to manage and track the infant formula.

As per FIG. 5, the applications 410 on the server 404 may be accessed by a variety of devices 502, 504, 506, 508, via the network 412. The devices 502, 504, 506, 508 may comprise any device, such as a personal computer, a personal digital assistant, a smart phone, or the like, which is configured to communicate over the network 412.

Figure 6:
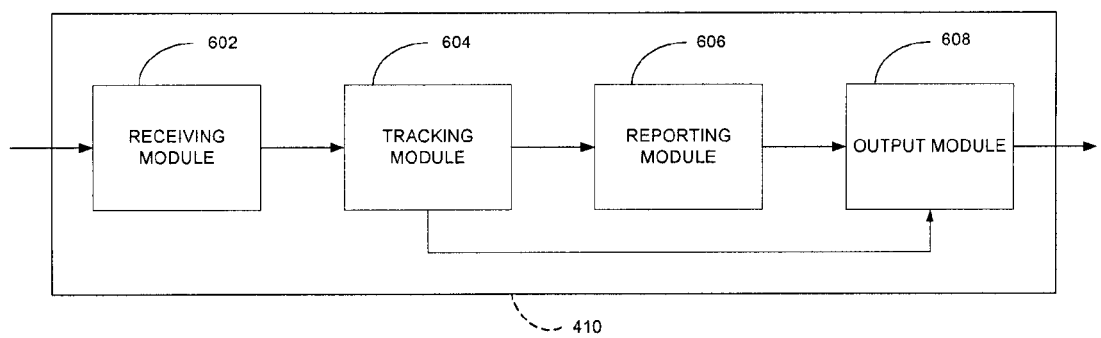
FIG. 6 is an exemplary embodiment of an application running on the processor of FIG. 4.

FIG. 6 is an exemplary illustration of an application 410 running on the processor 408. The application 410 may comprise a receiving module 602, a tracking (or management) module 604, a reporting module 606, and an output module 608. Upon reading with the scanning device 402 the barcode provided on the container and/or packaging of the formula product, e.g. a formula bottle, carton, or case, scan data is illustratively received at the receiving module 602. The scan data may be representative of the data encoded by the barcode, e.g. unique product code or number, batch or lot number, expiry date, if applicable, and a composition or ingredients of the formula.

In addition to receiving data related to formula products, the receiving module 602 is further adapted to receive input data received from a user, such as a nurse or an administrator, accessing the formula product tracking system 400. In particular, as will be discussed below, the input data may comprise information about at least one infant or baby to which a formula product is to be fed, information about the infant's mother, and information about other users, e.g. nurses or other medical professionals, having access to the system 400. It should be understood that any other relevant data may be received.

The receiving module 602 may then transmit the received data to the tracking module 604 for tracking the formula product. The outcome of the processing performed by the tracking module 604, e.g. an update to an inventory record of a given formula product or a confirmation of feeding thereof to an infant, may then be sent to the output module 608 so the latter may format the data for transmission to the devices 502, 504, 506, 508 for access by users thereof. The data may be communicated to the devices via email, Short Message Service (SMS), Multimedia Messaging Service (MMS), instant messaging (IM), or other suitable communication means known to those skilled in the art. The output module 608 may also format the data for rendering on an interface (not shown) presented on the devices 502, 504, 506, 508. The data output by the tracking module 604 may also be stored in the databases for future reference.

In addition, the tracking module 604 may further communicate with the reporting module 606 for generating reports that present information related to the tracking and management of the formula products. In particular, the reporting module 606 may compile data received from the tracking module 604 and generate reports accordingly. For example, the reporting module 606 may output formula inventory reports listing all formula products in inventory, baby information reports displaying information regarding infants requiring the formula products, or feeding reports listing all formula bottles fed to a given baby. The reporting data generated by the reporting module 606 may then be stored in the databases and/or sent to the output module 608 for transmission or rendering on the devices 502, 504, 506, 508. It should be understood that, depending on the user authority levels, the reporting data generated by the reporting module 606 may only be provided to selected ones of the devices 502, 504, 506, 508. As such, only authorized users, such as administrators, may be provided access to the reports.

Figure 7:
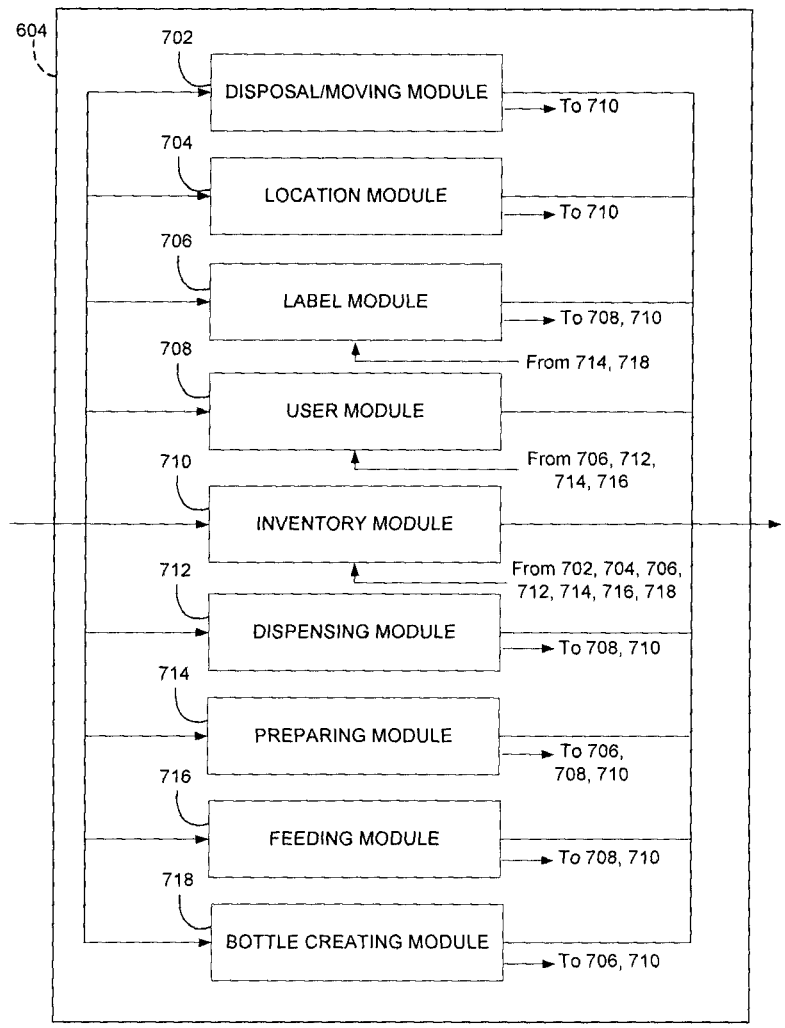
FIG. 7 is an exemplary embodiment of the tracking module of FIG. 6.

Referring now to FIG. 7, the tracking module 604 illustratively comprises a disposal/moving module 702, a location module 704, a label module 706, a user module 708, an inventory module 710, a dispensing module 712, a preparing module 714, a feeding module 716, and a bottle creating module 718. It should be understood that additional modules may be provided to enable the tracking module 604 to perform additional tasks for tracking and management of the formula products and of users associated with such products.

The dispensing module 712 may receive from the receiving module 602 infant data identifying an infant and a given formula product to be dispensed for the infant. The given formula product may have certain characteristics, e.g. a particular composition. As will be discussed further below, the databases may store a plurality of baby profiles from which baby labels may be generated. In some embodiments, the infant data may therefore be obtained upon scanning a baby label provided on a barcoded bracelet or the like, as will be discussed further below. The dispensing module 712 may further receive data indicative of a location for the formula product that is to be dispensed. Once the formula product in question has been retrieved, the dispensing module 712 may also receive scan data resulting from scanning the barcode of the formula product. The dispensing module 712 may then compare the scan data to the received infant data and location data in order to confirm that the appropriate formula product has been retrieved. For instance, the dispensing module 712 may compare the composition of the formula product, as obtained from the scan data, to the desired formula composition of the formula product to be dispensed for the infant. The dispensing module 712 may further generate a message confirming dispensing of the formula product. The message may then be sent to the reporting module 606 and/or the output module 608 for rendering on the devices 502, 504, 506, 508. The dispensing module 712 may also communicate with the user module 708 so the latter may associate in the databases the infant data with the dispensed formula product as well as with the inventory module 710 to update product inventory.

The preparing module 714 may be used for preparing formula. For this purpose, the preparing module 714 may receive the infant data as well as scan data resulting from scanning the barcode of the retrieved formula product. Upon receiving the data, the preparing module 714 may retrieve from the databases a formula recipe to be used for preparing a formula that matches to the infant data. The recipe may then be output to the devices 502, 504, 506, 508 by the output module 608. The preparing module 714 may also receive formula product data indicative of a number of containers, e.g. bottles, being prepared, a volume thereof if advanced formula preparation is used, and a storage location for the containers. Upon receiving the data, the preparing module 714 may communicate with the label module 706 so the latter may create new labels for the prepared formula bottles and cause the labels to be printed. The preparing module 714 may further output a message indicating that the bottles have been successfully prepared for the infant in question and according to a desired composition. The message may also indicate that new labels have been printed. This message may be sent to the reporting module 606 and/or the output module 608 for rendering on the devices 502, 504, 506, 508. The preparing module 714 may also communicate with the user module 708 so the latter may link in the databases the infant data to the prepared formula as well as with the inventory module 710 to update product inventory.

The feeding module 716 may further be used in feeding the formula product to an infant. The feeding module 716 illustratively receives infant data indicating that an infant is to be fed a formula product having certain characteristics, e.g. a given composition or specific ingredients. The feeding module 716 may then retrieve from the database(s) a listing of all formula products available at the facility and search the listing to identify the formula product(s) best suited for the infant, e.g. according to the specified characteristics. The search results may then be sent to the reporting module 606 and/or the output module 608 for rendering on the devices 502, 504, 506, 508. Upon a selected one of the formula products being retrieved for feeding the infant, the barcode associated with the retrieved product may be scanned for verification purposes. The feeding module 716 may then receive scan data for the retrieved formula product and compare the scan data to the data identifying the formula products identified as suitable for the infant. In this manner, it can be ensured that the retrieved formula product is indeed among the products identified as suitable for the infant, thereby confirming that the infant has been fed with an appropriate product. A confirmation message may be generated and sent to the output module 608. In addition, the feeding module 716 may communicate with the user module 708 and the inventory module 710 for updating the baby's record and the product inventory.

The bottle creating module 718 may be used in creating formula bottles from a given formula packaging, e.g. a carton. For this purpose, the bottle creating module 718 may receive data indicative of the formula to be used, the number of bottles to be created, the location of the packaging from which the formula bottles are to be created, and the location where the newly created bottles are to be stored. Other relevant data may also be received. The bottle creating module 718 may then communicate with the label module 706 for generation of a new label for each one of the bottles to be created. Each new label may indicate a unique identifier assigned to each new bottle, the name of the formula product used, and the location of the new bottles within the facility. The bottle creating module 718 may then generate a confirmation that the new bottles have been created and send the message to the output module 608. The bottle creating module 718 may further communicate with the inventory module 710 for updating the product inventory.

The disposal/moving module 702 may receive from the receiving module 602 input data indicating that a given formula product, for which scan data may also be received at the receiving module 602, is to be disposed of, i.e. removed from the system 400. The disposal/moving module 702 may further receive data indicating the current location of the formula product to be disposed of and the reason for disposal. When a formula product is to be moved within the facility, the input data may also indicate the current location and the new location of the formula product. The disposal/moving module 702 may then communicate with the inventory module 710 for updating inventory records according to the received data and generate a message confirming disposal/relocation of the formula product.

The location module 704 may be used to manage the various storage locations provided within the facility as well as to track the physical position of each one of the formula products. In particular, the receiving module 602 may receive location data providing updated information about a given storage location. Upon receiving the data, the location module 704 may then access the databases, which may store a listing of all storage locations within the facility, to update the information of the corresponding storage location. The location data may also comprise information about a new storage location to be added to or removed from the listing of storage locations stored in the databases. The received location data may alternatively be related to a storage location for a given formula product, for which scan data has been received at the receiving module 602. For instance, the location data may indicate a storage requirement, e.g. room temperature, for the formula product. Upon receiving the location data, the location module 704 may then search the databases for at least one storage location matching the storage requirement. Upon finding a suitable storage location, the location module 704 may output a message to this effect. The location module 704 may further communicate with the inventory module 710 for updating of formula product records.

The label module 706 may further be used for creating labels containing information from the profile of a user, such as a baby or a mother, requiring the formula product. The label module 706 may also cause printing of the labels using printers (not shown) coupled to the application 410. For this purpose, the label module 706 may receive user data indicative of a user for which a label is to be created/printed. The label module 706 may also receive label data, e.g. an identification of the printer or a type and number of labels to be printed. As discussed above, the label data may be received from the preparing module 714 or the bottle creating module 718. The label module 706 may then retrieve from the databases information associated with the user's profile and create the label from the retrieved information. For example, when a baby label is printed, information such as the baby's name, unique identifier in the system 400, date of birth, attending doctor, and the formula composition to be fed to the baby, may be encoded to create a barcode to be printed on the label. Once the label has been created, instructions may be sent by the label module 706 to a printer for printing of the label. The printed label may, upon being scanned, be used for a variety of verification purposes. For instance, scanning of the label may allow confirmation that the proper formula product, e.g. having an adequate composition, has been fed to the appropriate baby, as discussed above. The label module 706 may further feed the label data to the user module 708 and the inventory module 710 for updating records/inventory.

The user module 708 may be used for managing the profiles of various users of the system 400. In particular, the user module 708 may receive from the receiving module 602 user data for a user accessing the system 400. Such information may comprise a username and password manually entered by the user. Other relevant information associated with the user's profile, as stored in the databases, may also be received. The data received by the user module 708 may further comprise scan data further to scanning of the user's label. Moreover and as discussed above, the user module 708 may receive user data from the dispensing module 712, the feeding module 716, the label module 706, and the preparing module 714. The user module 708 may then manage the user's profile, e.g. update the user's information stored in the databases, according to the received data. In some embodiments, the user module 708 may further communicate with an electronic health records system (not shown) for updating medical records of a given user, e.g. a baby or a mother thereof, according to the user's profile. In particular, an allocated product can be automatically entered into the patient's medical record with all of the relevant information from the product's barcode.

The inventory module 710 may be used to manage the inventory of formula products provided at the facility. Such an inventory may comprise a plurality of inventory records stored in the databases and each associated with a corresponding formula product. The inventory module 710 may receive formula product data, such as a name, type, quantity, volume, etc., for a given formula product. The formula product data may have been entered manually into the system or may be received from the disposal/moving module 702, the location module 704, the label module 706, the dispensing module 712, the preparing module 714, the feeding module 716, and the bottle creating module 718, as discussed above. The inventory module 710 may then update the product's inventory record according to the received data. In this manner, accurate inventory control of the formula products may be achieved.

Figure 8:
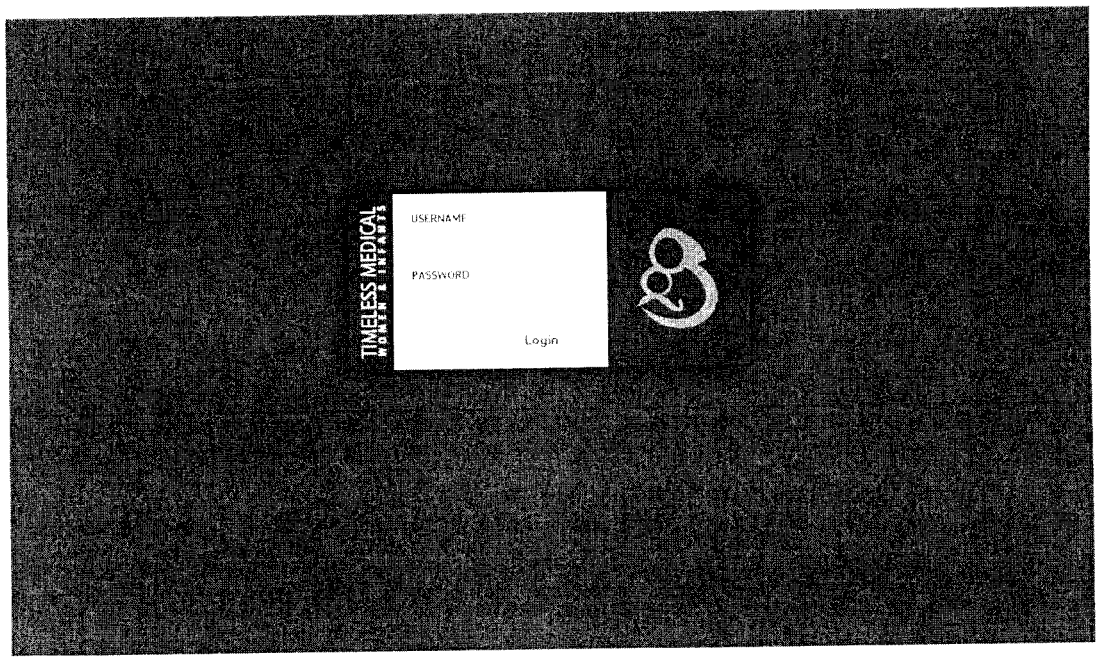
Figure 9:
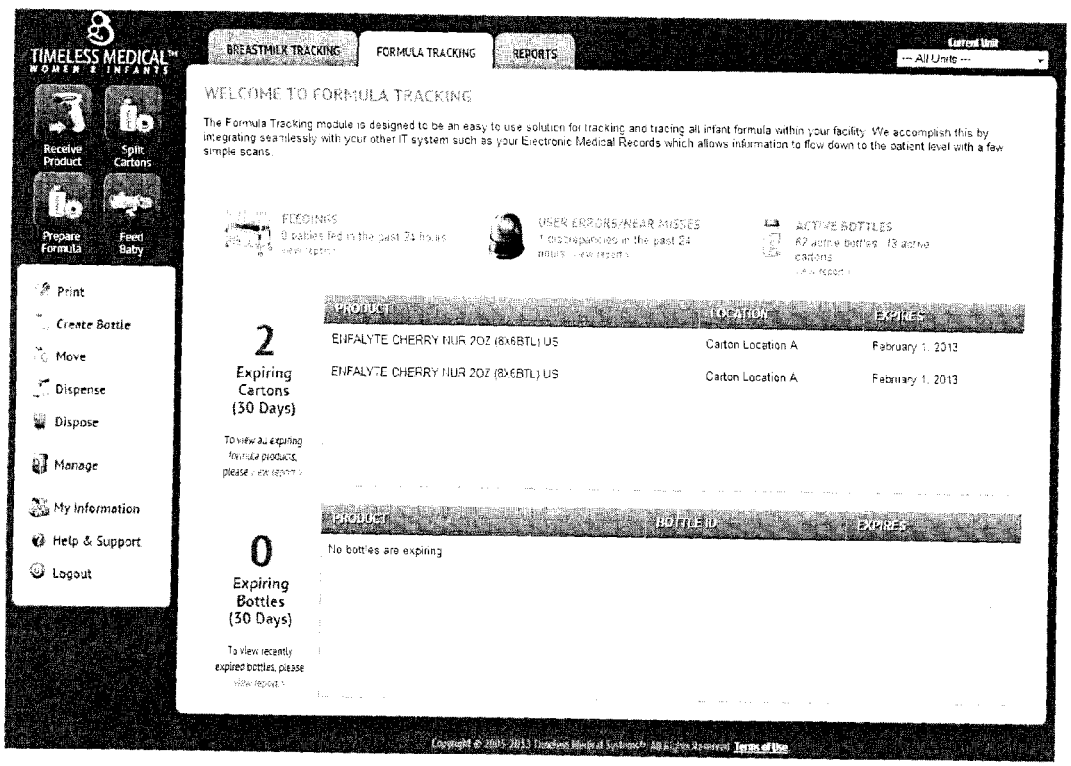

FIG. 8 is an exemplary login page for accessing the software tool used for infant formula tracking. The tool may be protected with usernames and/or passwords. FIG. 9 is an exemplary start page of the software tool. Tracking may be performed on bottles (i.e. individual containers), cartons, and cases. Expiring bottles, cartons, and cases may be displayed separately with their respective product names, locations, and expiry dates. The start page may further enable one or more control elements or options (not shown) to be selected using an input device, such as a touchscreen, a mouse, or the like (not shown) provided with the devices 502, 506, 506, 508. Upon selecting the options, the formula products may be managed. For example, it becomes possible to use the tool to split cartons, dispense formula products, prepare formula and feed a baby, move or dispose of formula products, and the like, as will be discussed further below. Other selectable items may also enable reports, e.g. feeding reports, active bottles reports, or error reports, to be viewed.

The infant formula product may be distributed throughout the location at which it is received and tracked by means of scanning at various touch points. Some exemplary touch points for scanning comprise breakdown of a pallet, breakdown of a case, dispensing of a carton, dispensing of a bottle, opening a carton for the purposes of removing a bottle, preparation of a bottle for feeding (i.e. splitting a bottle into individual feedings, adding another component to the bottle, etc), and feeding a bottle to an infant. If the package does not have a 2D barcode, one may be added using the software tool. At the time of scanning of an infant formula product, whether it be at receipt, feeding, preparing, dispensing, etc, inventory control and/or electronic health records of the baby and/or the mother may be updated in real time. The software tool may be interfaced with other existing systems to perform this update. At any time, the infant formula product can be scanned to verify product code, lot number, expiry date, origin of the product and other information that has been embedded in the 2D barcode.

Figures 10, 11:
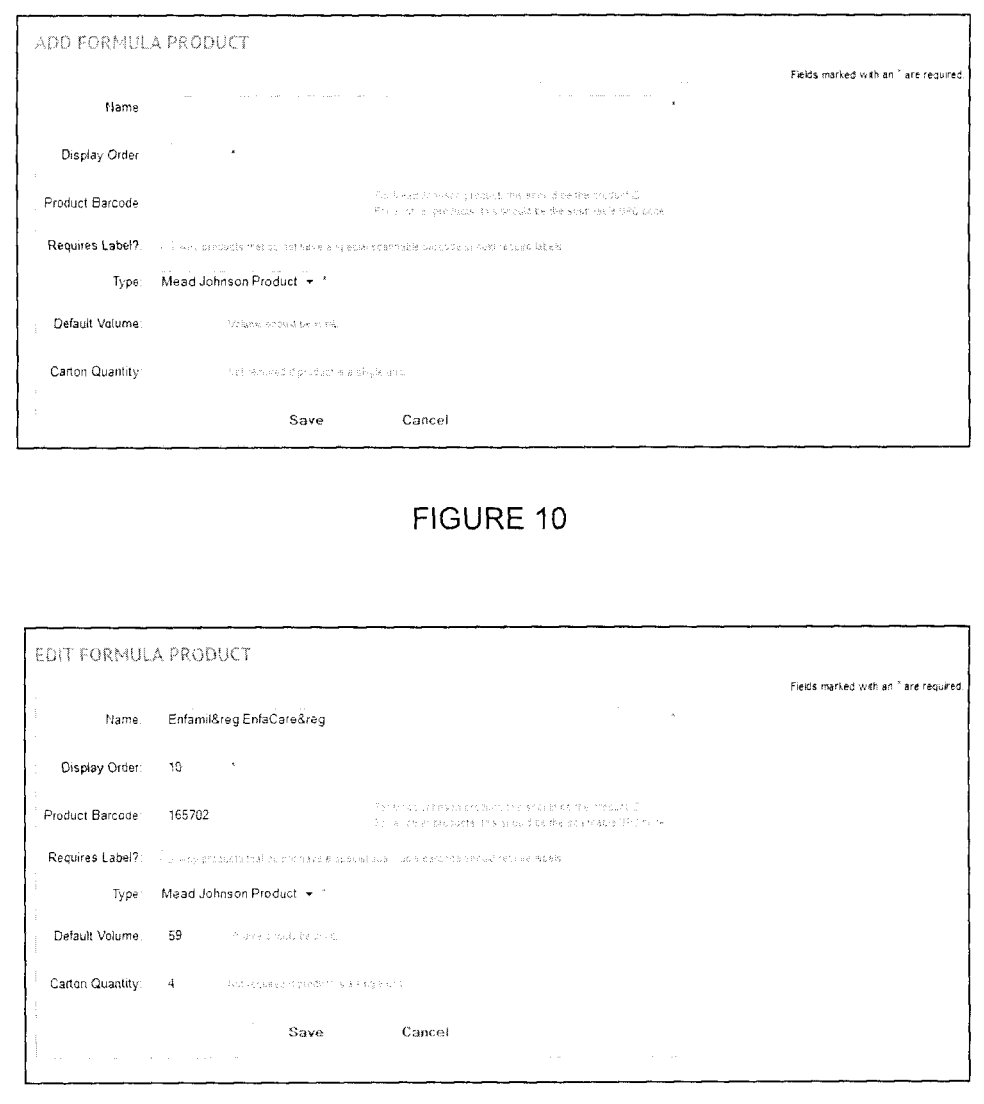

FIGS. 10, 11, and 12 illustrate exemplary screen shots for managing formula products. As per FIG. 10, a set of fields may be completed to add a new formula product, upon scanning of the barcode. Providing this information will associate the recorded information with the scanned barcode, thereby linking the data encoded in the barcode and extracted therefrom with the data entered manually into the system 400. As per FIG. 11, the data associated with the scanned product may be edited at any time. The add formula product and edit formula product pages may be available through a manage formula product page, as illustrated in FIG. 12.

Figure 13:
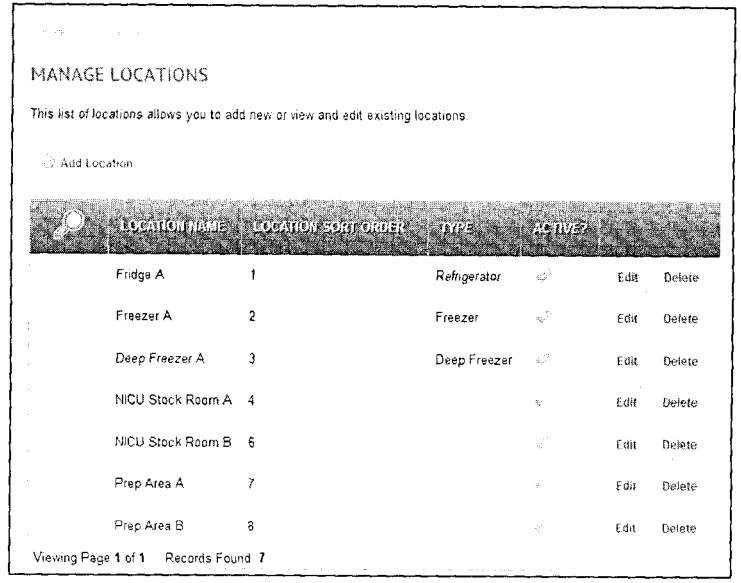
Figure 14:
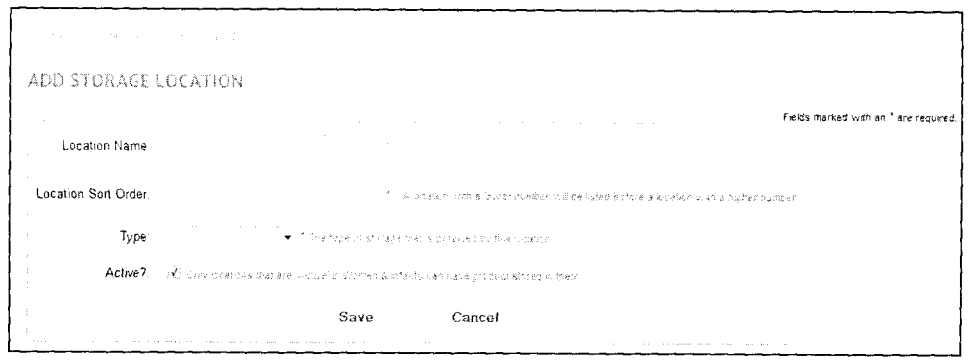
Figure 15:
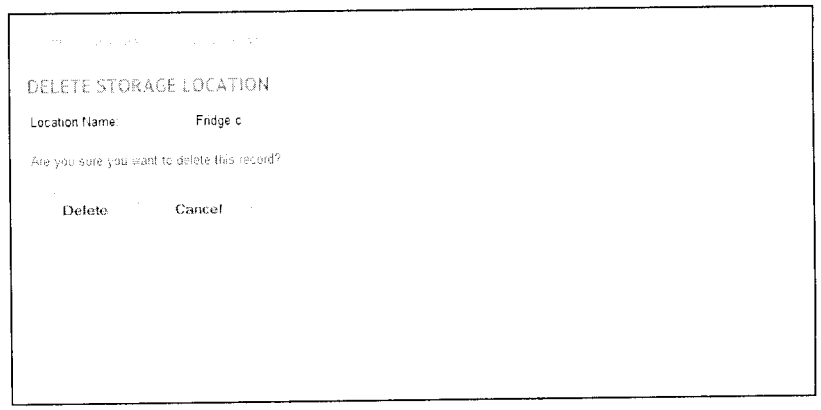
Figure 16:
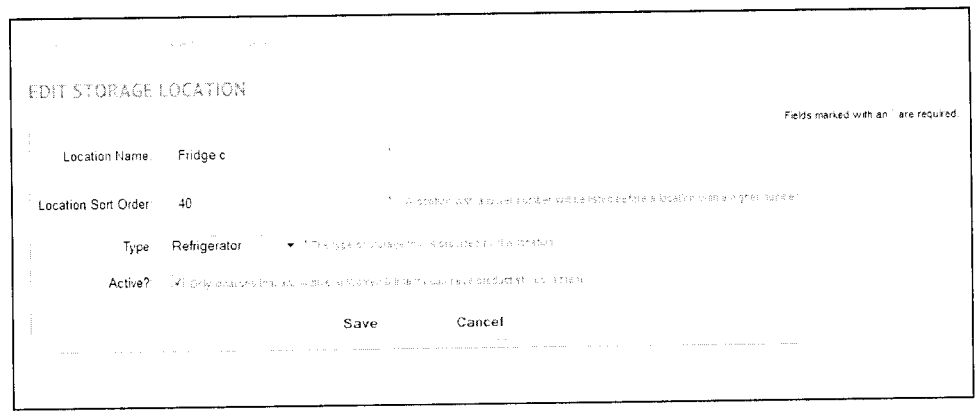

The infant formula products may be scanned and tracked at a wide variety of potential receiving locations, such as a distribution center, a hospital, a clinic, a doctor's office, and a retailer. FIG. 13 illustrates an exemplary screen shot for managing different storage locations within any given facility. As per FIG. 14, a new storage location may be added by providing data regarding the new storage location. FIG. 15 illustrates how to delete a storage location while FIG. 16 illustrates how to edit a storage location. Managing the storage locations allow full tracking of the physical disposition of the infant formula products within the facility. If some products require cold storage while other products require room temperature or warm storage, they can be associated with the appropriate storage location and can be easily found by accessing the system 400.

Figure 17:
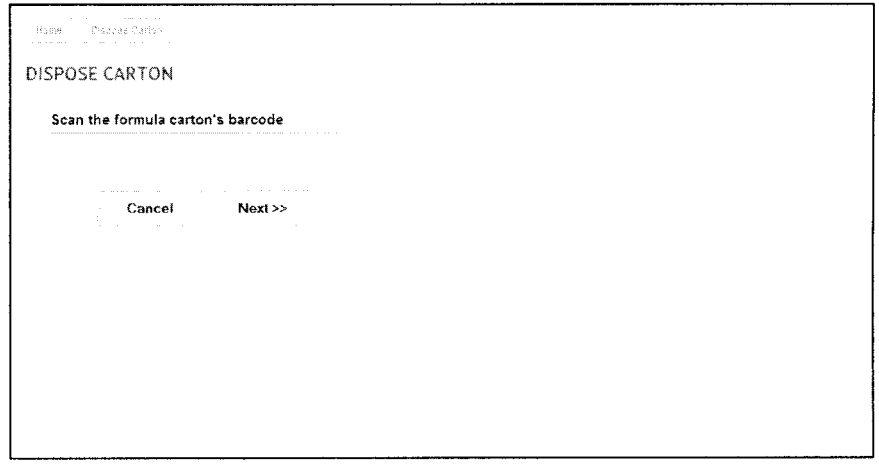
Figure 18:
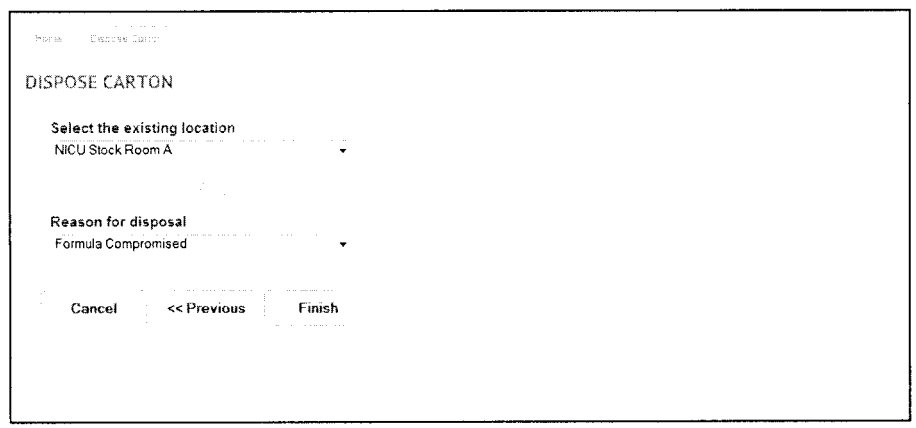
Figure 19:
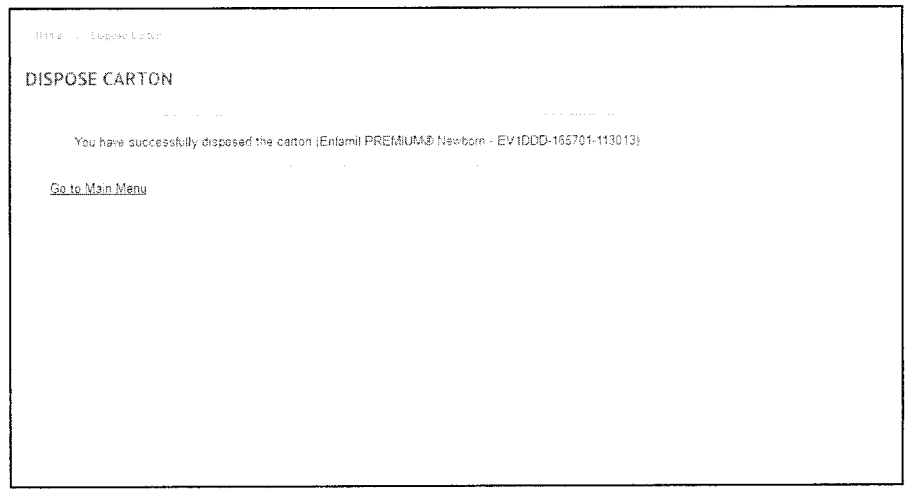

In certain instances, it may be necessary to dispose of a container, carton, or case of formula for various reasons, such as contamination, expiry, etc. This means that the product is to be removed from the system 400. FIG. 17 is an exemplary screen shot of a page for disposing of a carton. The carton's barcode is scanned and may be entered automatically into the field displayed on the page. FIG. 18 illustrates the following page, whereby the location of the carton being disposed and the reason for disposal are selected. FIG. 19 confirms that the carton has been disposed and removed from the system 400.

Figure 20:
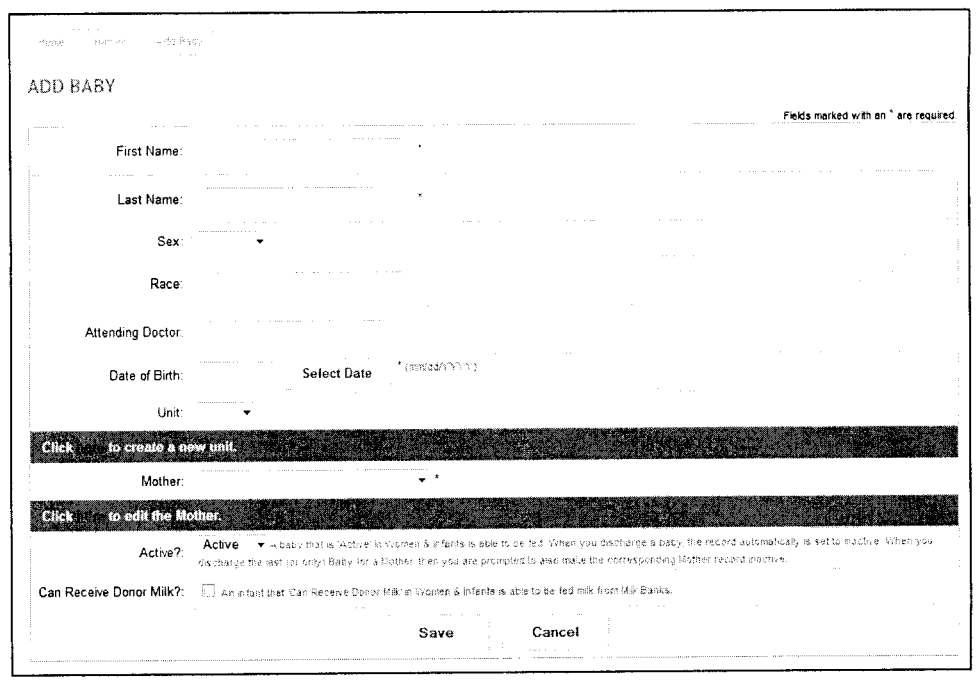
Figure 21:

The software tool for tracking infant formula products may also comprise directories for babies and mothers. FIG. 20 is an exemplary screen shot of a page to add a baby into the system 400. Various information regarding the baby is entered manually. FIG. 21 illustrates a completed baby profile. The baby is indicated as being "active", which means that the baby is able to be fed and will be requiring infant formula. A discharged baby is said to be "inactive". Some of the information provided for a given baby may be the attending doctor and the mother's name, as well as a baby ID and other information. FIG. 22 illustrates a baby management page. The list of babies allows the user to add new babies (FIG. 20), view the baby profiles (FIG. 21), or edit baby profiles, as shown in FIG. 21.

Figure 27:
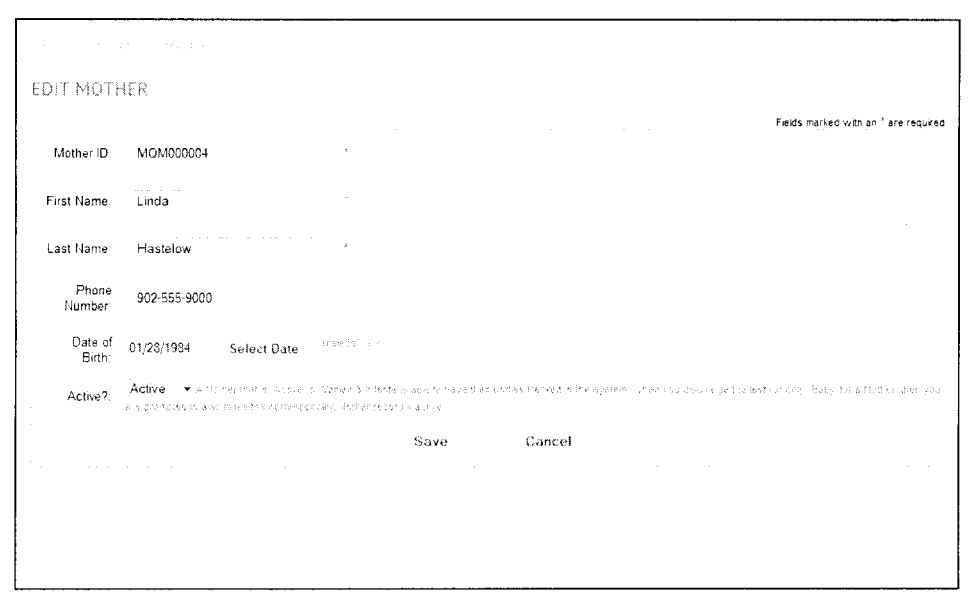

Similarly, FIG. 24 is an exemplary screen shot of a page to add a mother into the system 400. Various information regarding the mother is entered manually. FIG. 25 illustrates a completed mother profile. The mother's babies are listed in the same profile as the mother. FIG. 26 illustrates a mother management page. The list of mothers allows the user to add new mothers (FIG. 24), view the mother profiles (FIG. 25), or edit mother profiles, as shown in FIG. 27. Therefore, mother and babies may be linked by the software tool.

Figure 28:
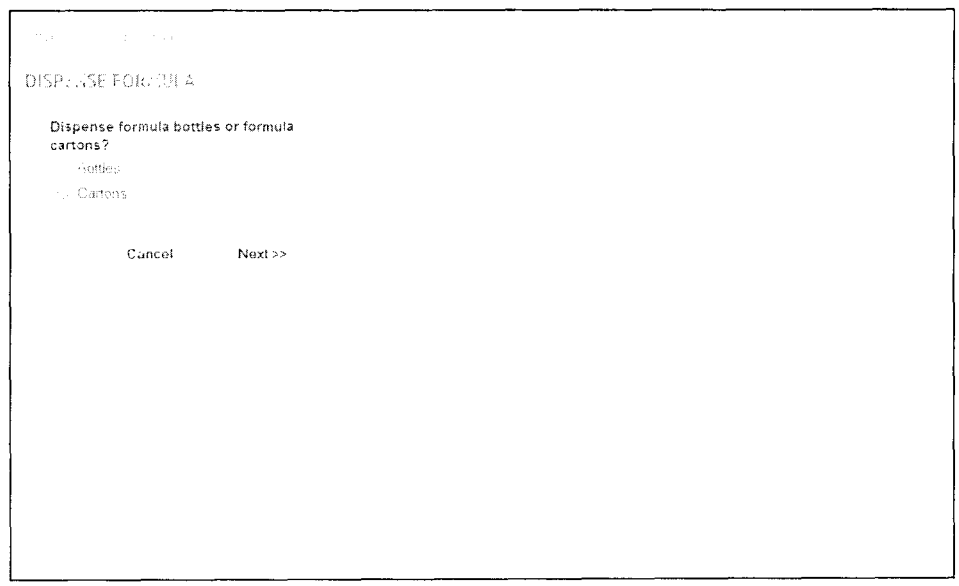
Figure 29:
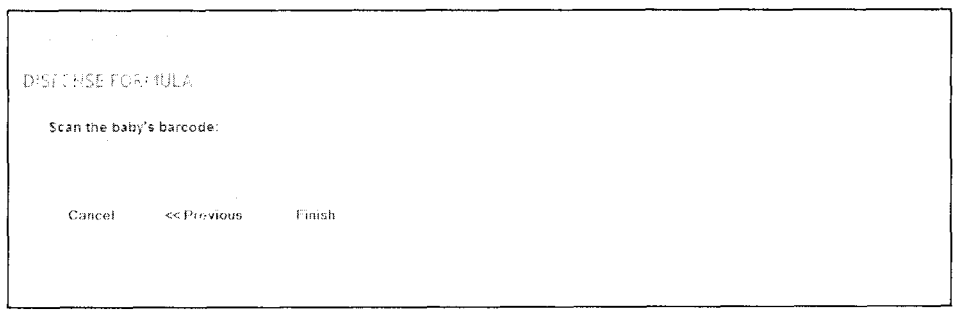
Figure 30:
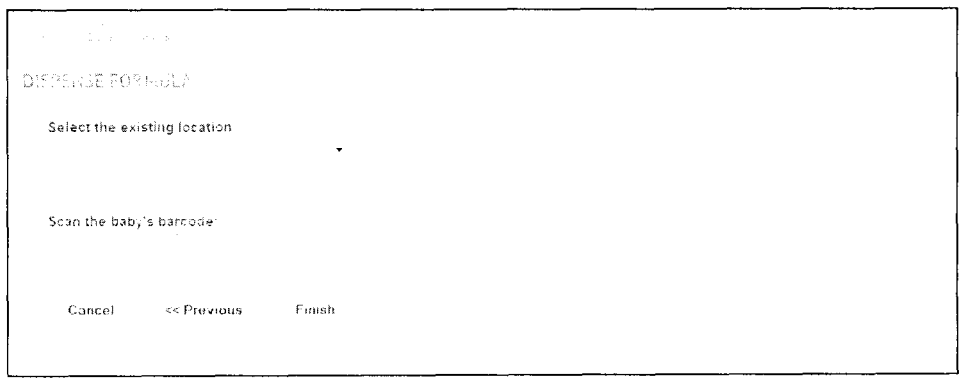
Figure 31:
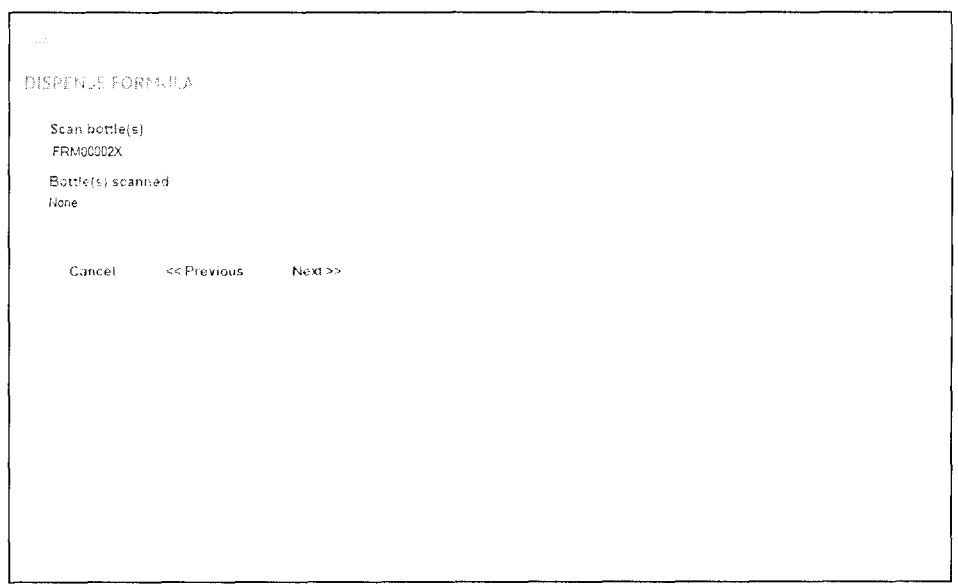
Figure 32:
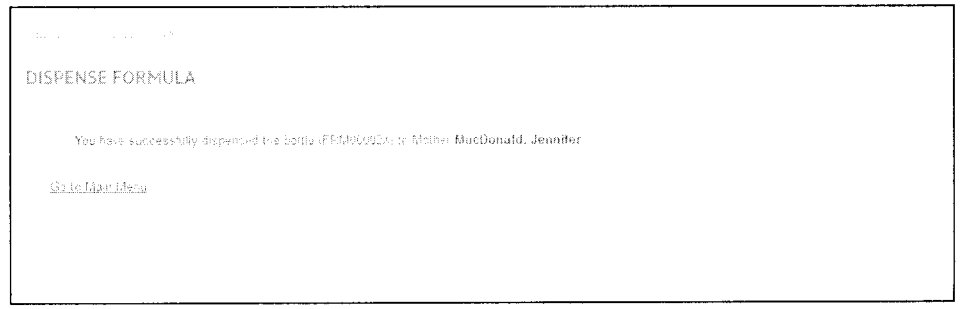
Figure 33:
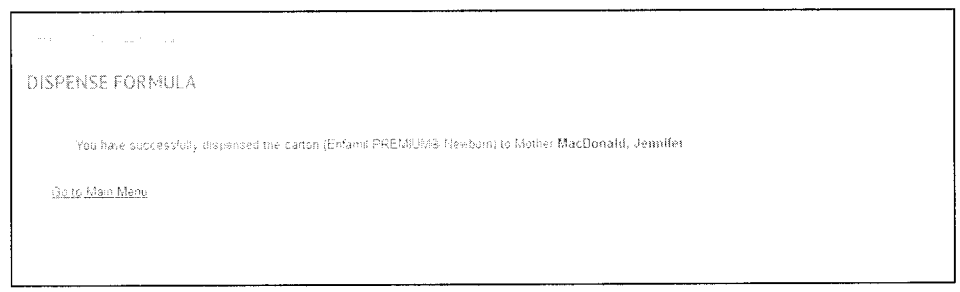

Formula products may be dispensed on a per bottle basis, a per carton basis, or a per case basis. FIG. 28 illustrates an exemplary screen shot offering the option of dispensing formula per bottle or per carton. In some embodiments, the formula is dispensed by scanning the baby's barcoded bracelet, which has been previously entered into the system 400 in the baby's profile. FIG. 29 is an exemplary screenshot of this embodiment. The software tool may also ask that the location for the formula be selected, in addition to scanning the baby's barcode, as per the embodiment illustrated in FIG. 30. Once the location is identified and the appropriate product is retrieved, the product may be scanned for confirmation, as per FIG. 31. FIGS. 32 and 33 are exemplary screenshots of confirmation messages for dispensing bottles and cartons, respectively.

Figure 34:
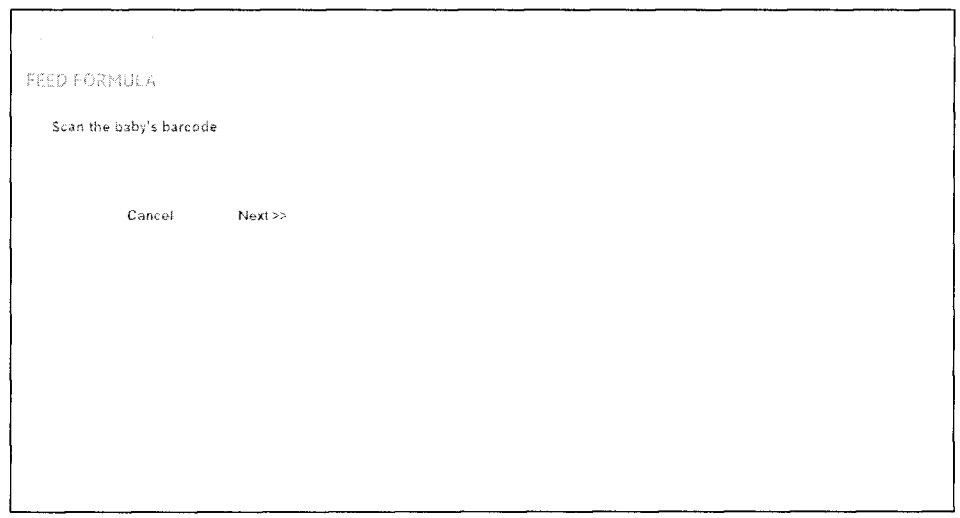
Figure 35:
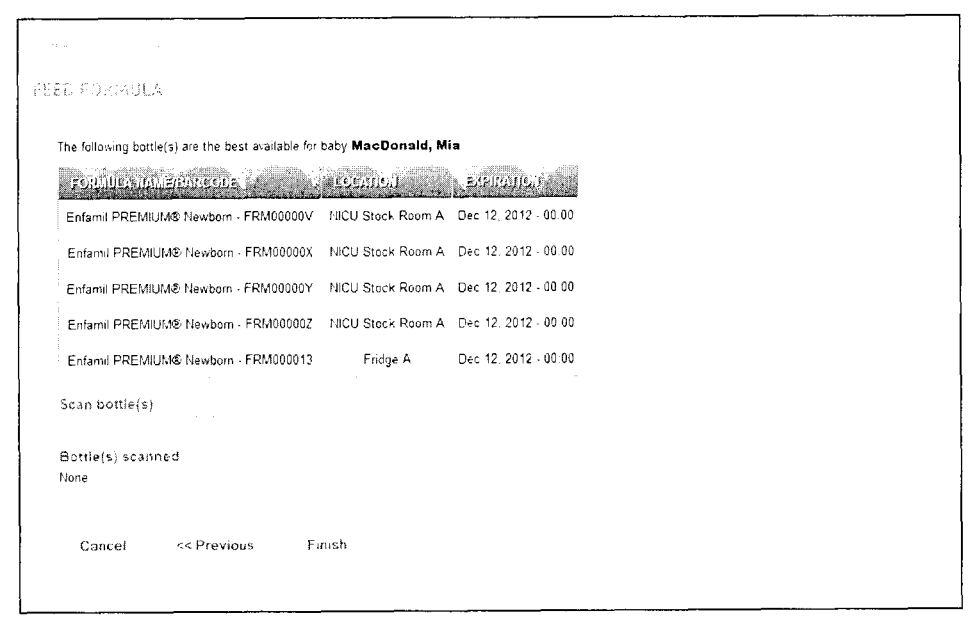
Figure 36:

In addition to tracking formula dispensing, the software tool may also be used to track formula feeding. As per FIG. 34, to feed a formula product to a baby, the baby's barcode may be scanned. The best available formulas for the identified baby may then be suggested to the user, as per FIG. 35. The user will scan the bottle of the selected formula and the system 400 will confirm that the bottle has been fed to the identified baby, as per FIG. 36.

Figure 37:
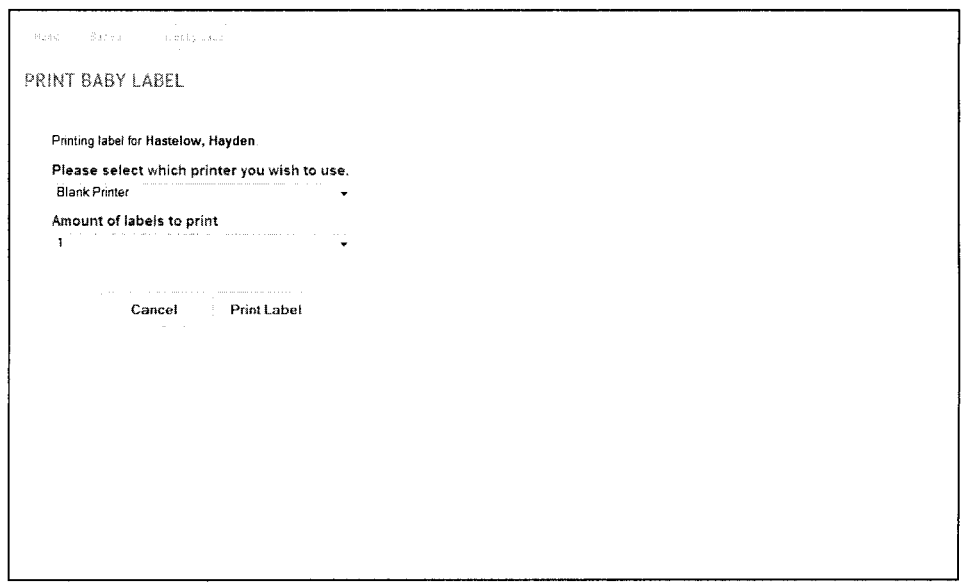
Figure 38:
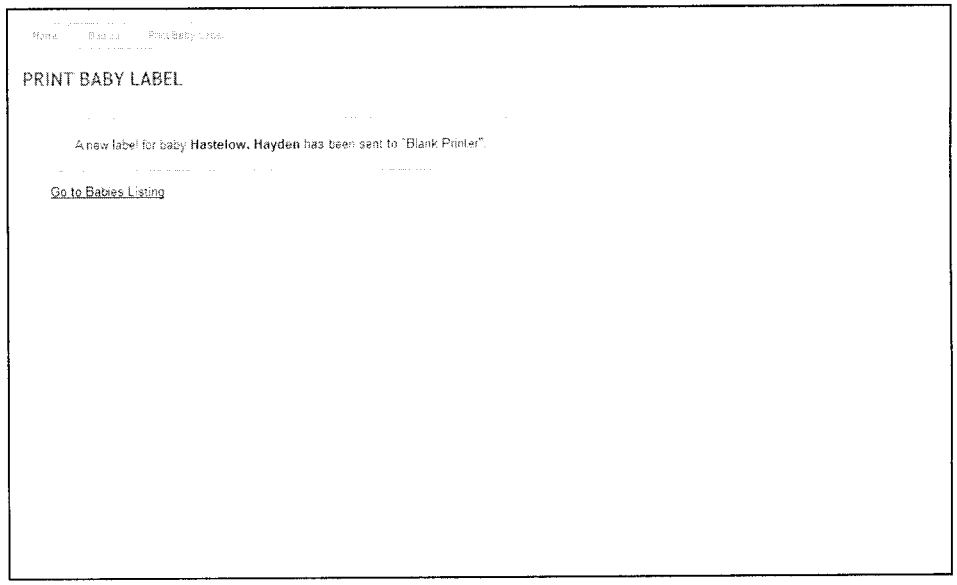
Figure 39:
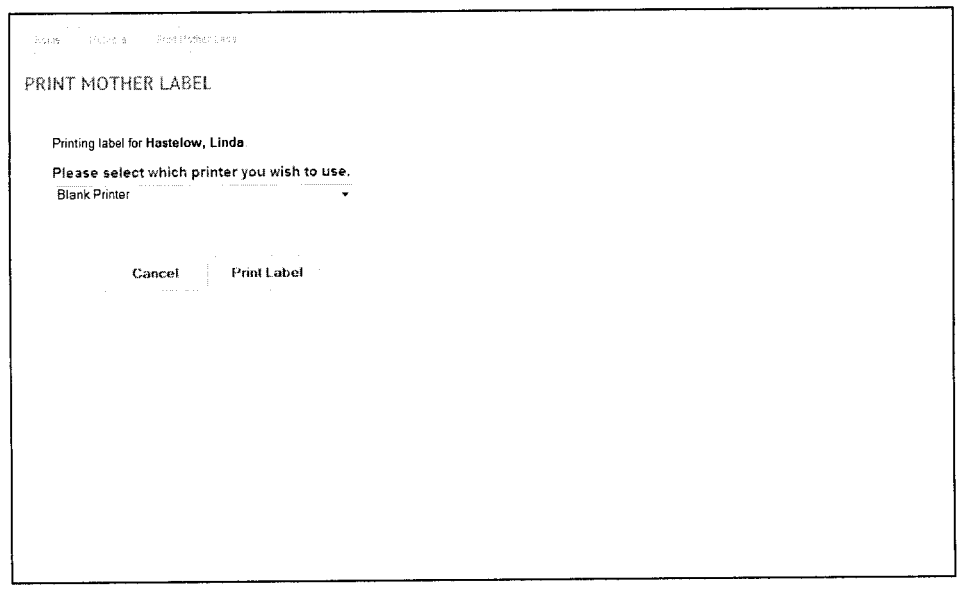
Figure 40:
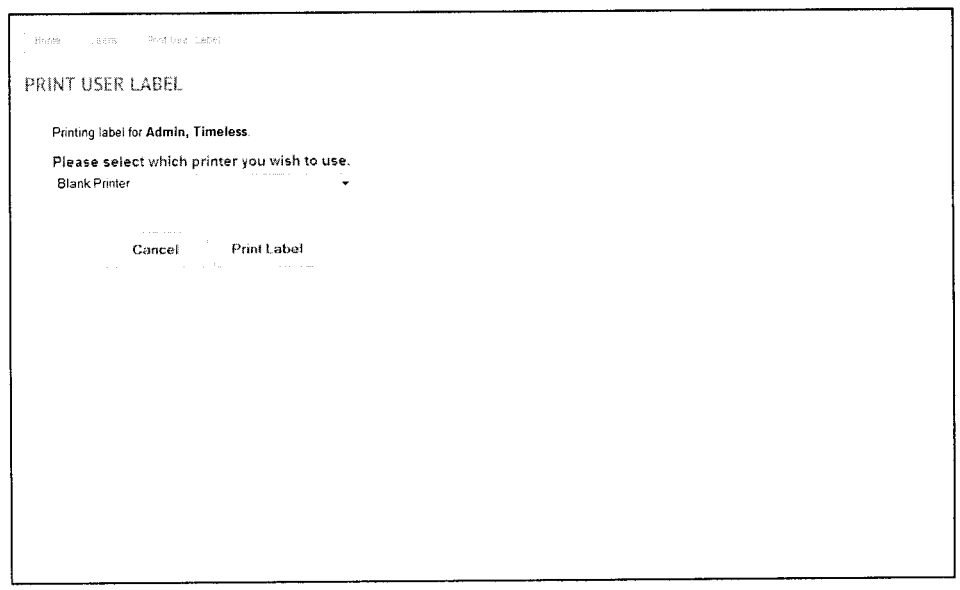
Figure 41:
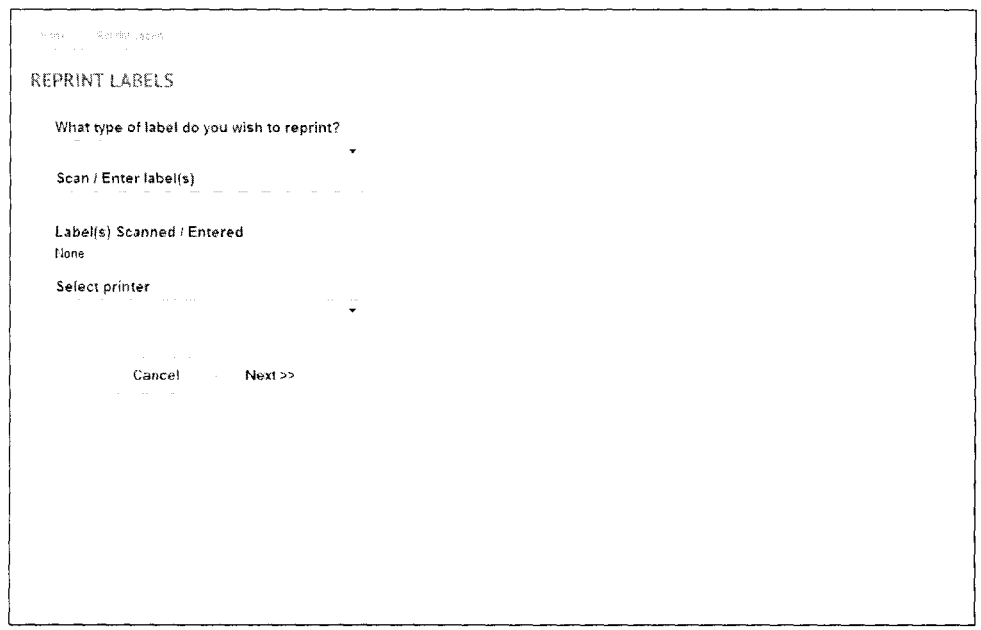
Figure 42:
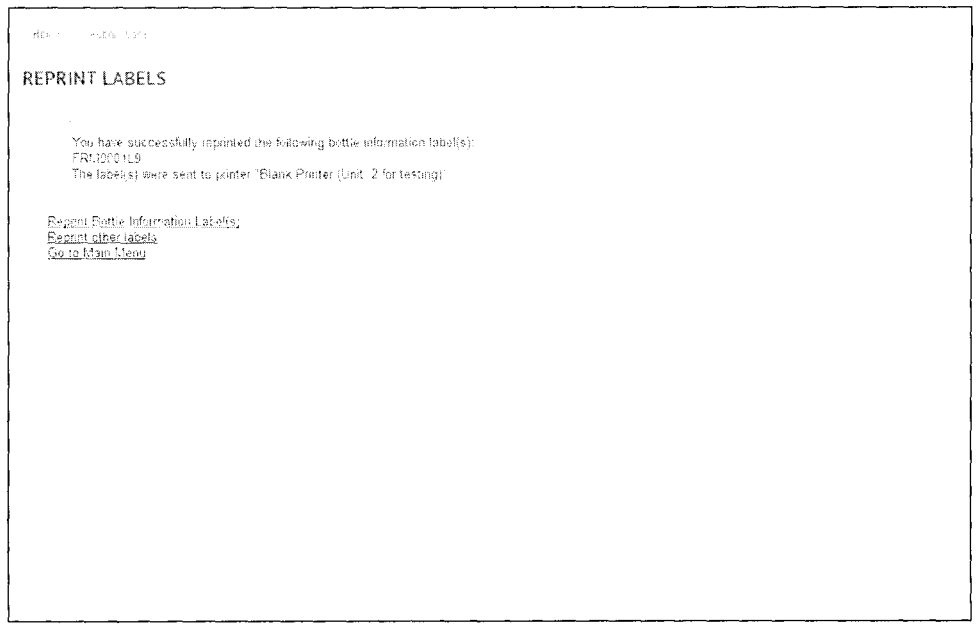

The system 400 on which the software tool application is running may be connected to one or more printers (not shown). Printers may be added and removed as desired. The printers may be used to print various labels, such as the labels applied directly to the products. The printers may also be used to print baby labels, mother labels, and user labels. FIG. 37 is an exemplary screen shot for printing baby labels. The baby labels may comprise the information previously shown to be on the baby's profile. It may also comprise data indicating which infant formula product is associated with the baby and therefore, scanning the baby's label may be used to confirm that the proper formula has been fed or dispensed to the appropriate baby. FIG. 38 shows that a new label has been printed for the baby. FIGS. 39 and 40 illustrate the options of printing new labels for the mother and for a user, such as a nurse or an administrator, respectively. FIGS. 41 and 42 further illustrate the options of reprinting the above-mentioned labels.

Figure 43:
Figure 44:
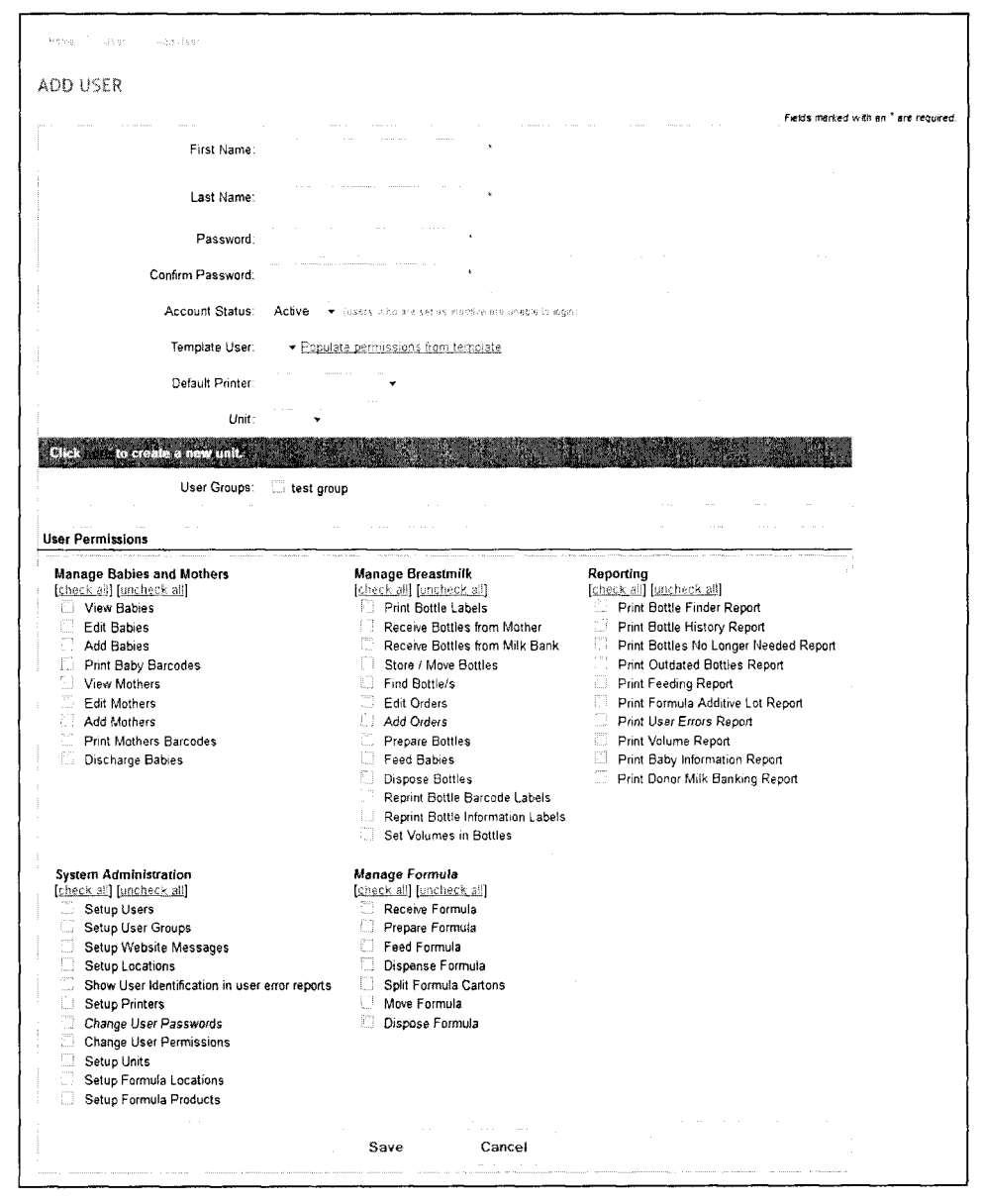

Various users of the system 400 may also be managed, as per the listing illustrated in FIG. 43. Each user may have a User ID and have selectively set permissions. FIG. 44 illustrates an exemplary page for adding a user, whereby many different privileges are listed, related to managing babies and mothers, managing the infant formula, reporting functions, and administrator functions. Each user profile may also be edited at a later time, to make changes to the information or to the privileges associated with the user, as illustrated in FIG. 45. User groups may also be provided and managed using the same features as those for users, i.e. adding, editing, and viewing user group information.

Figure 46:
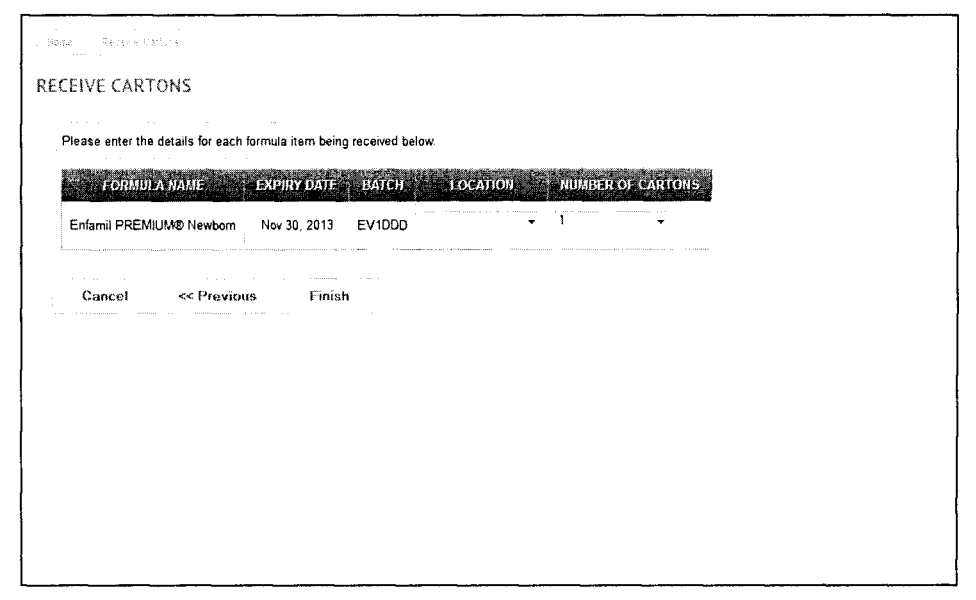
Figure 47:
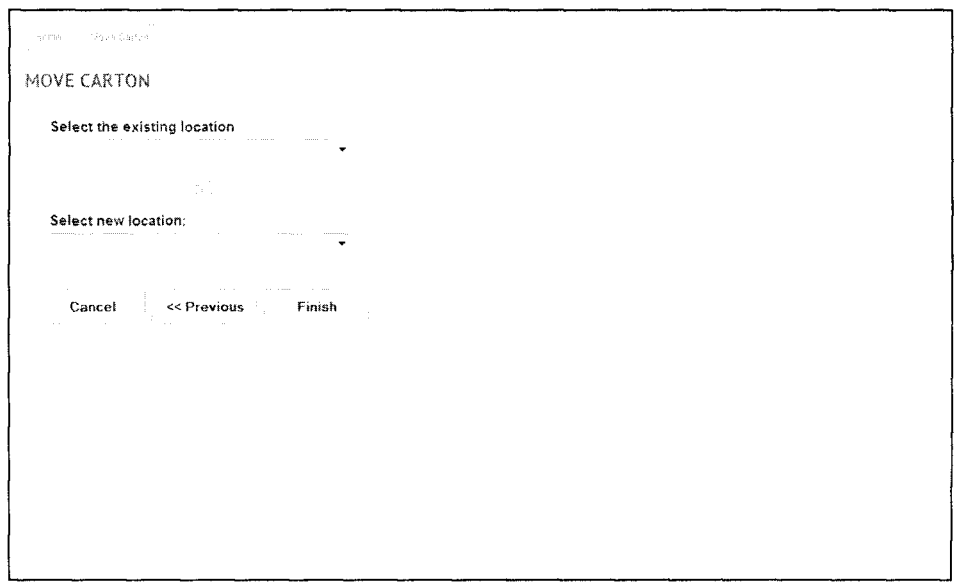
Figure 48:
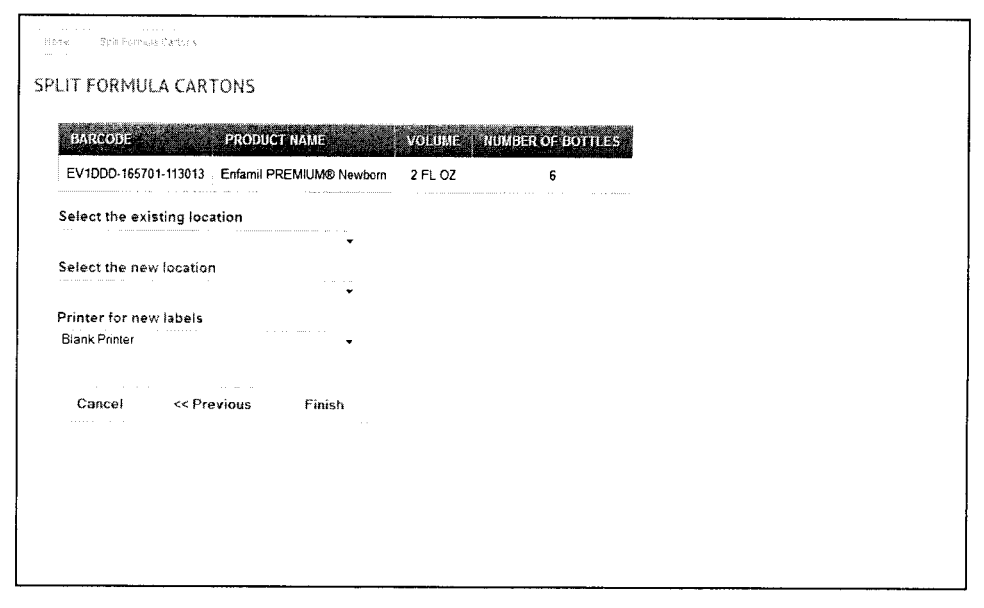

Cartons may be received, moved, and split to store at different locations. Each of these steps may begin with scanning the barcode of a given cart. FIGS. 46, 47, and 48 are exemplary screenshots for the steps occurring after scanning. When a new carton is received, its storage location is selected. When a carton is moved, its new location is selected. When a carton is split, new labels may be printed to place on the product.

Figure 49:
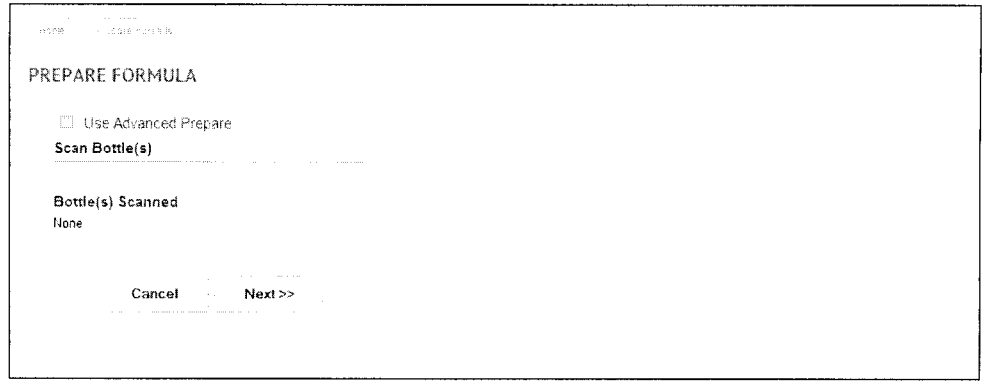
Figure 50:
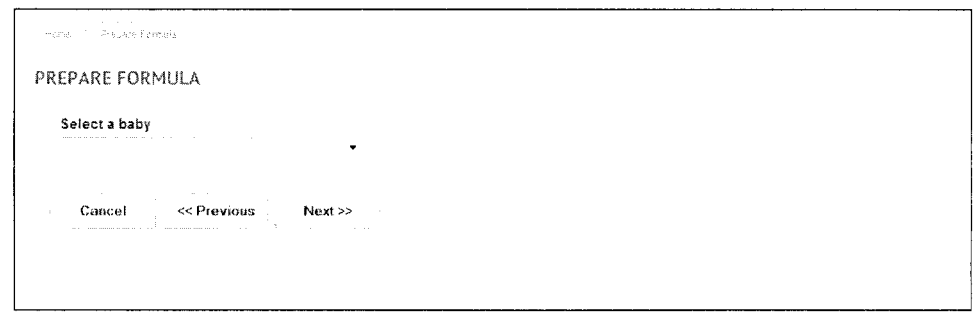
Figure 51:
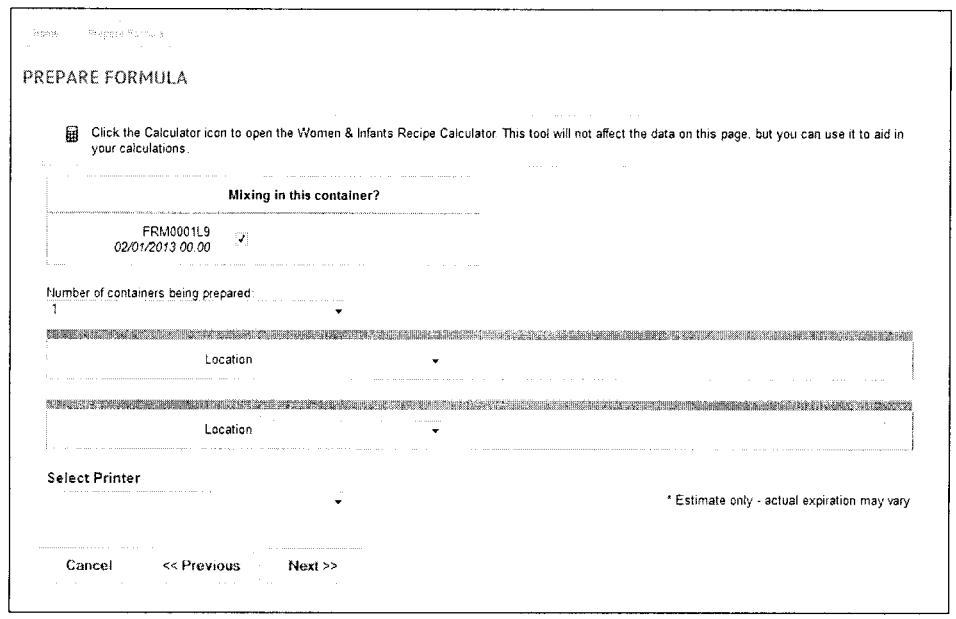

When preparing formula, an existing bottle may be used. For this purpose, the bottle may be scanned and its barcode provided to the system 400 (see FIG. 49). Information about the baby for which the formula is to be prepared may also be entered as shown in FIG. 50. Information about the number of containers to be prepared and the new location thereof may also be requested and entered (FIG. 51). A recipe calculator may further be accessed to provide the user with a recipe for preparing the formula. New labels for the prepared formula containers may then be generated and printed (FIG. 52). The summary of the prepared formula is provided to the user, as per FIG. 52, clearly indicating the new bottle's ID, its label, expiration data, and other relevant information. In one embodiment shown in FIG. 53, an advanced prepare functionality may be provided. In this case, one can track the volume of each container being prepared relative to the volume of the original formula bottle.

Figure 54:
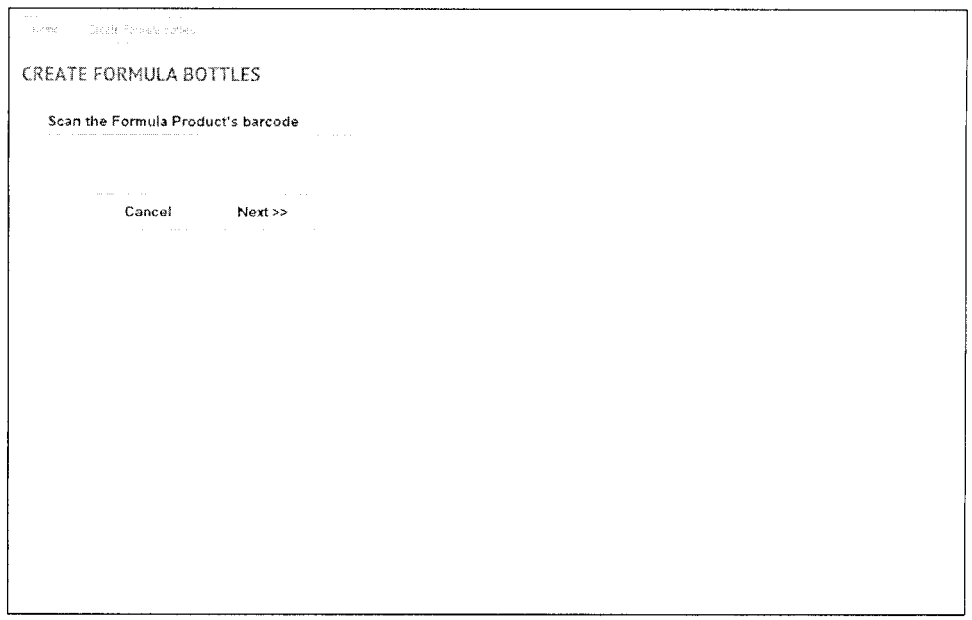
Figure 56:

FIG. 54, FIG. 55, and FIG. 56 further illustrate the steps for creating formula bottles from a given formula container, such as a carton or case, stored at a given location in the facility. Upon creating the new bottles, corresponding labels may be generated and printed for each bottle.

Figure 57:
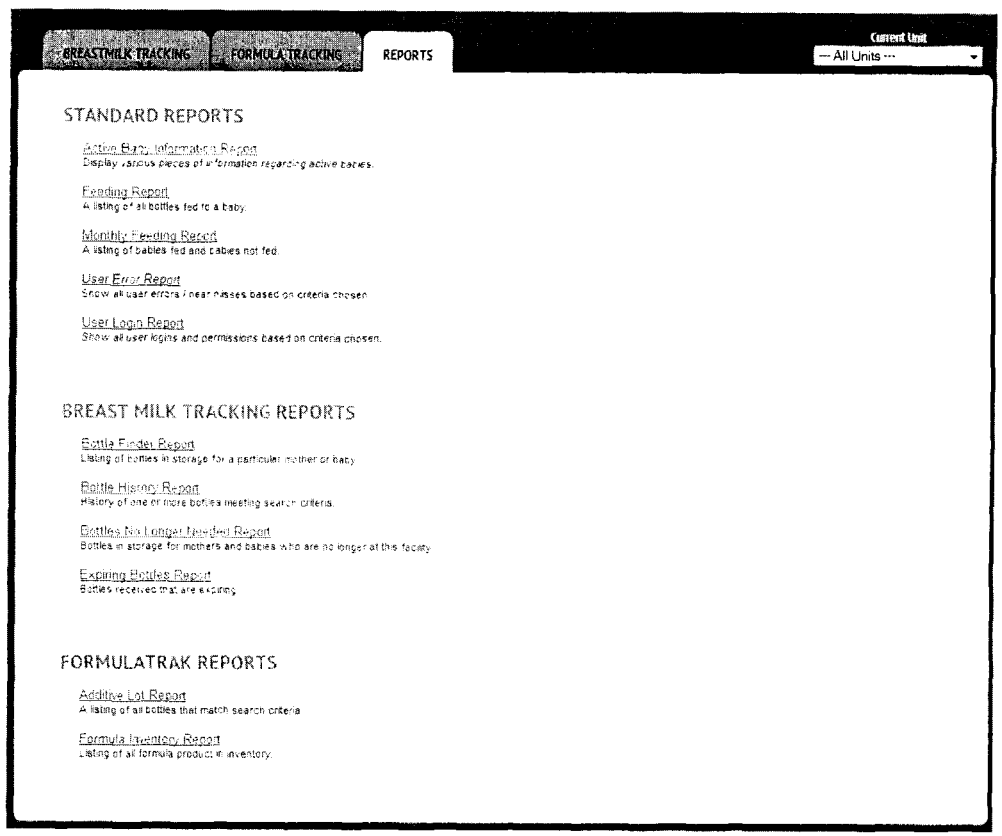

FIG. 57 further illustrates reports that may be generated by the system 400. For instance, baby information reports, feeding reports, formula inventory reports, login reports, and error reports, may be generated, as discussed above.

Figure 58:
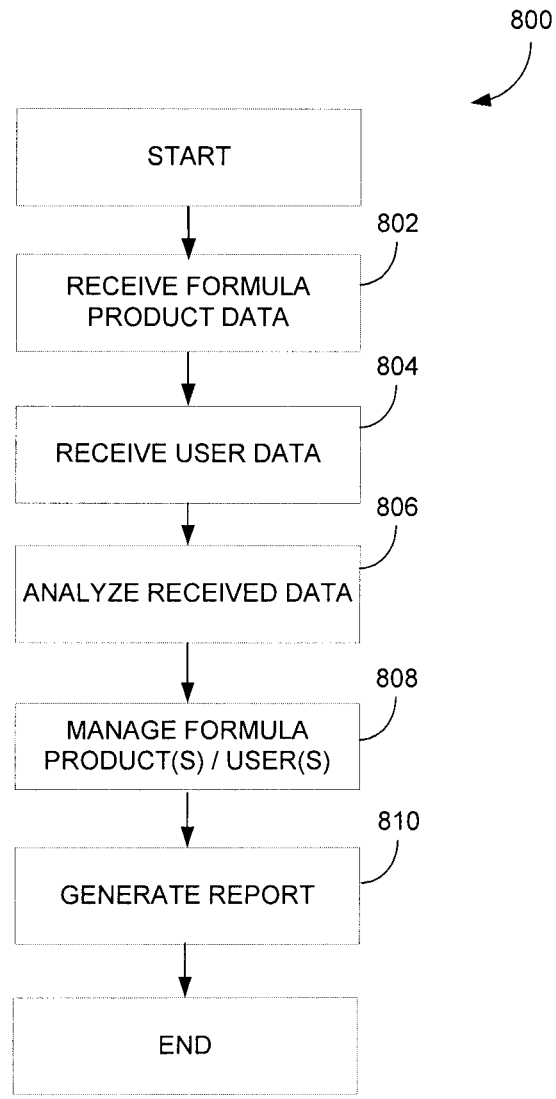
FIG. 58 is an exemplary embodiment for a method for tracking infant formula.
Figure 59:
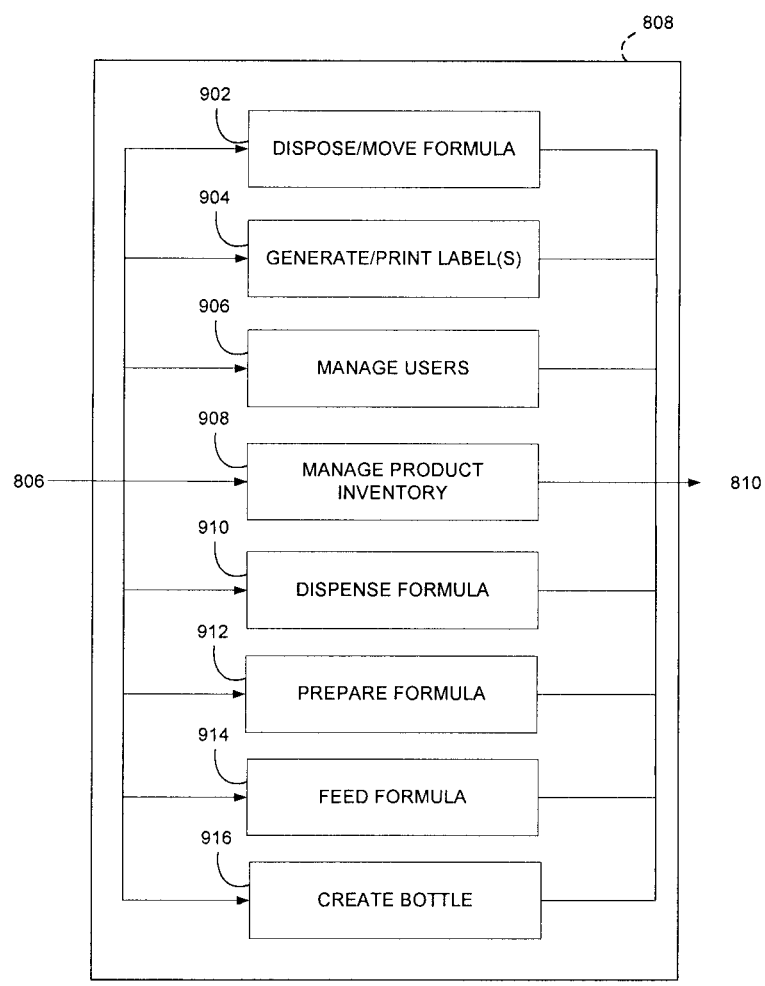
FIG. 59 is an exemplary embodiment for the step of tracking formula product(s)/user(s) of FIG. 58.

Referring now to FIG. 58, a method 800 for tracking an infant formula illustratively comprises receiving formula product data at step 802, receiving user data at step 804, analyzing the received data at step 806, managing the formula product(s)/user(s) at step 808, and generating reports at step 810 if desired. As shown in FIG. 59, the step 808 of managing formula product(s)/user(s) may comprise at least one of the following activity steps described above with reference to the system 400: disposing/moving formula 902, generating/printing label(s) 904, managing users 906, managing product inventory 908, dispensing formula 910, preparing formula 912, feeding formula 914, and creating formula bottles 916.

Using the system 400 and the method 800, inventory tracking may be implemented using the information provided on the formula product's barcode. Certain safety mechanisms can also be put into place to ensure that a patient is not fed an expired product, a patient is fed a formula in accordance with a prescribed composition, and the product in question is not a counterfeit. As such, one can ensure that the right product is fed to the right baby. The system 400 and method 800 may also be used to meet various compliance requirements from organizations such as the FDA and the Joint Commission, and to generate reports used for auditing purposes.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system.

The structure illustrated is thus provided for efficiency of teaching the present embodiment.

It should be noted that the present invention can be carried out as a method, can be embodied in a system, a computer readable medium or an electrical or electro-magnetic signal. The embodiments of the invention described above are intended to be exemplary only.

The invention claimed is:

1. A system for tracking an infant formula product, the system comprising:
  a memory having stored therein a plurality of inventory records each associated with a corresponding one of a plurality of infant formula products provided at a facility, each one of the plurality of inventory records comprising product data uniquely identifying the corresponding infant formula product, the product data comprising a formula composition of the corresponding infant formula product;
  a processor coupled to the memory; and
  at least one application stored in the memory and executable by the processor for
    receiving infant data indicating that an infant is to be allocated a desired formula composition, the infant data received further to an infant label being scanned, the infant label having coded thereon at least one of a unique identifier associated with the infant, a name of the infant, a date of birth of the infant, an attending doctor for the infant, and an identification of the desired formula composition;
    querying the memory with the infant data for comparing the desired formula composition to the formula composition of each one of the plurality of infant formula products and identifying on the basis of the comparison at least one of the plurality of infant formula products suitable for allocating to the infant;
    receiving coded data uniquely identifying a selected one of the plurality of infant formula products;
    comparing the coded data to the product data of the at least one suitable infant formula product; and
    outputting a confirmation that the selected one of the plurality of infant formula products is suitable for allocating to the infant if the coded data matches the product data of the at least one suitable infant formula product.

2. The system of claim 1, wherein the at least one application is executable by the processor for receiving the coded data comprising at least one of a batch number, a product code, an expiry date, a formula composition, and an origin of the selected infant formula product.

3. The system of claim 1, wherein the at least one application is executable by the processor for receiving input data indicating that an authenticity of the selected one of the plurality of infant formula products is to be established and wherein the at least one application is executable by the processor for retrieving from the memory the inventory record of the selected one of the plurality of infant formula products, comparing product data from the inventory record to the coded data, and establishing the authenticity of the selected formula product if the coded data matches the product data.

4. The system of claim 1, wherein the at least one application is executable by the processor for receiving the coded data further to an encrypted barcode attached to the selected infant formula product being scanned.

5. The system of claim 1, wherein the at least one application is executable by the processor for receiving the coded data further to a Radio Frequency Identification (RFID) tag attached to the selected infant formula product being read.

6. The system of claim 1, wherein the memory has stored therein a plurality of user records each uniquely identifying a corresponding one of a plurality of users requiring at least one of the plurality of infant formula products and further wherein the at least one application is executable by the processor for linking in the memory a user record of the infant to the inventory record of the selected infant formula product.

7. The system of claim 6, wherein the at least one application is executable by the processor for accessing an electronic health records system comprising a plurality of electronic medical records and entering the coded data into the electronic medical record of the infant in real-time for indicating allocation of the selected infant formula product to the infant.

8. The system of claim 1, wherein the at least one application is executable by the processor for receiving input data indicating that a given one of the plurality of infant formula products is to be disposed of and further wherein the at least one application is executable by the processor for updating the inventory record of the given infant formula product to indicate a disposal of the given infant formula product.

9. The system of claim 1, wherein the memory has stored therein the plurality of inventory records each comprising an identification of a current location within the facility for the corresponding one of a plurality of infant formula products and wherein the at least one application is executable by the processor for receiving input data indicating that a given one of the plurality of infant formula products is to be relocated from the current location to a new location within the facility and updating the inventory record of the given infant formula product to indicate a relocation of the given infant formula product from the current location to the new location.

10. The system of claim 1, wherein the at least one application is executable by the processor for receiving input data indicating that at least one new infant formula product is to be created from a given one of the plurality of infant formula products and further wherein the at least one application is executable by the processor for assigning at least one new identity to the at least one new infant formula product and creating in the memory at least one new inventory record for the at least one new infant formula product.

11. A computer-implemented method for tracking an infant formula product, the method comprising executing on a processor program code for:
  receiving infant data indicating that an infant is to be allocated a desired formula composition, the infant data received further to an infant label being scanned, the infant label having coded thereon at least one of a unique identifier associated with the infant, a name of the infant, a date of birth of the infant, an attending doctor for the infant, and an identification of the desired formula composition;
  querying a memory with the infant data for comparing the desired formula composition to a formula composition of each one of a plurality of infant formula products, the memory having stored therein a plurality of inventory records each associated with a corresponding one of the plurality of infant formula products provided at a facility, each one of the plurality of inventory records comprising product data uniquely identifying the corresponding infant formula product, the product data comprising a formula composition of the corresponding infant formula product;
  identifying on the basis of the comparison at least one of the plurality of infant formula products suitable for allocating to the infant;

receiving coded data uniquely identifying a selected one of the plurality of infant formula products;

comparing the coded data to product data of the at least one suitable infant formula product; and outputting a confirmation that the selected one of the plurality of infant formula products is suitable for allocating to the infant if the coded data matches the product data of the at least one suitable infant formula product.

12. The method of claim 11, wherein receiving the coded data comprises receiving at least one of a batch number, a product code, an expiry date, a formula composition, and an origin of the selected infant formula product.

13. The method of claim 11, further comprising receiving input data indicating that an authenticity of the selected one of the plurality of infant formula products is to be established, retrieving from the memory the inventory record of the selected one of the plurality of infant formula products, comparing the product data from the inventory record to the coded data, and establishing the authenticity of the selected formula product if the coded data matches the product data.

14. The method of claim 11, wherein receiving the coded data comprises receiving the coded data further to an encrypted barcode attached to at least one of a container and a packaging of the selected infant formula product being scanned at the facility, the encrypted barcode attached on a manufacturing line at the time of production of the selected infant formula product using one of a laser and a printer.

15. The method of claim 12, further comprising retrieving from the coded data the formula composition of the selected infant formula product and comparing the formula composition to the desired formula composition for confirming whether the selected one of the plurality of infant formula products is suitable for dispensing to the infant.

16. The method of claim 11, further comprising linking the inventory record of the selected infant formula product to a user record of the infant stored in the memory, thereby indicating allocation of the selected infant formula product to the infant.

17. The method of claim 11, further comprising receiving input data indicating that at least one new infant formula product is to be created from a given one of the plurality of infant formula products, assigning at least one new identity to the at least one new infant formula product, and creating in the memory at least one new inventory record for the at least one new infant formula product.

18. The method of claim 11, wherein receiving the infant data comprises receiving an indication that one or more containers are to be prepared with the desired formula composition, the method further comprising querying the memory with the infant data for retrieving a recipe for preparing the one or more containers in accordance with the desired formula composition, generating one or more labels having coded thereon container data uniquely identifying the one or more containers, and outputting a control signal comprising instructions for causing the one or more containers to be prepared in accordance with the recipe and the one or more labels to be printed and attached to the one or more prepared containers.

19. A computer readable medium having stored thereon program code executable by a processor for tracking an infant formula product, the program code executable for:

receiving infant data indicating that an infant is to be allocated a desired formula composition, the infant data received further to an infant label being scanned, the infant label having coded thereon at least one of a unique identifier associated with the infant, a name of the infant, a date of birth of the infant, an attending doctor for the infant, and an identification of the desired formula composition;

querying a memory with the infant data for comparing the desired formula composition to a formula composition of each one of a plurality of infant formula products, the memory having stored therein a plurality of inventory records each associated with a corresponding one of the plurality of infant formula products available at a facility, each one of the plurality of inventory records comprising product data uniquely identifying the corresponding infant formula product, the product data comprising a formula composition of the corresponding infant formula product;

identifying on the basis of the comparison at least one of the plurality of infant formula products suitable for allocating to the infant;

receiving coded data uniquely identifying a selected one of the plurality of infant products;

comparing the coded data to product data of the at least one suitable infant formula product; and outputting a confirmation that the selected one of the plurality of infant formula products is suitable for allocating to the infant if the coded data matches the product data of the at least one suitable infant formula product.

* * * * *